US010687236B2

(12) United States Patent
Li et al.

(10) Patent No.: US 10,687,236 B2
(45) Date of Patent: Jun. 16, 2020

(54) USER EQUIPMENT, NETWORK DEVICE, AND LOGGED MINIMIZATION OF DRIVE TESTS MEASUREMENT METHOD

(71) Applicant: Huawei Technologies Co., Ltd., Shenzhen (CN)

(72) Inventors: Bingzhao Li, Beijing (CN); Xiaodong Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/211,984

(22) Filed: Jul. 15, 2016

(65) Prior Publication Data

US 2016/0330644 A1    Nov. 10, 2016

Related U.S. Application Data

(63) Continuation of application No. PCT/CN2014/082473, filed on Jul. 18, 2014.

(30) Foreign Application Priority Data

Jan. 17, 2014    (WO) ............... PCT/CN2014/070811

(51) Int. Cl.
*H04W 24/10* (2009.01)
*H04W 4/06* (2009.01)
*H04W 84/04* (2009.01)

(52) U.S. Cl.
CPC ............ *H04W 24/10* (2013.01); *H04W 4/06* (2013.01); *H04W 84/042* (2013.01)

(58) Field of Classification Search
CPC ................................ H04W 24/00; H04W 4/00
See application file for complete search history.

(56) References Cited

U.S. PATENT DOCUMENTS

2011/0194441 A1    8/2011    Jung et al.
2011/0250880 A1*   10/2011   Olsson .................. H04W 76/18
                                              455/423

(Continued)

FOREIGN PATENT DOCUMENTS

CN    101155403 A    4/2008
CN    101931981 A    12/2010

(Continued)

OTHER PUBLICATIONS

3GPP TS 36.300 V11.8.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Dec. 2013, 209 pages.

(Continued)

*Primary Examiner* — Jung H Park
(74) *Attorney, Agent, or Firm* — Slater Matsil, LLP

(57) ABSTRACT

A user equipment is configured to receive logged minimization of drive tests (MDT) configuration information and to determine, according to the received logged MDT configuration information, a Multimedia Broadcast Multicast Service (MBMS) set used for triggering logged MDT measurement and a measurement parameter used for performing the logged MDT measurement. The user equipment is also configured to perform the logged MDT measurement based on the measurement parameter when determining that an MBMS used for triggering the logged MDT measurement is being received, where the MBMS used for triggering the logged MDT measurement belongs to the MBMS set used for triggering the logged MDT measurement, thereby implementing the logged MDT measurement.

20 Claims, 8 Drawing Sheets

A UE receives logged MDT configuration information — 510

The UE determines, according to the logged MDT configuration information, an MBMS set used for triggering logged MDT measurement and a measurement parameter used for performing the logged MDT measurement — 520

The UE performs the logged MDT measurement based on the measurement parameter when determining that an MBMS used for triggering the logged MDT measurement is being received — 530

(56) References Cited

U.S. PATENT DOCUMENTS

| | | |
|---|---|---|
| 2012/0088457 A1 | 4/2012 | Johansson et al. |
| 2013/0010624 A1* | 1/2013 | He .................... H04L 41/5009 370/252 |
| 2013/0012166 A1* | 1/2013 | Li .......................... H04W 4/02 455/411 |
| 2013/0053017 A1 | 2/2013 | Chang |
| 2013/0137379 A1* | 5/2013 | Jung .................... H04W 24/10 455/67.11 |
| 2014/0051428 A1* | 2/2014 | Jung .................... H04W 24/08 455/422.1 |
| 2014/0056169 A1 | 2/2014 | Jung et al. |
| 2014/0087716 A1 | 3/2014 | Vaderna et al. |
| 2014/0376441 A1* | 12/2014 | Lohmar .................. H04W 4/06 370/312 |
| 2015/0201344 A1* | 7/2015 | Wu ........................ H04W 4/06 370/252 |

FOREIGN PATENT DOCUMENTS

| | | |
|---|---|---|
| CN | 102123415 A | 7/2011 |
| CN | 102137430 A | 7/2011 |
| CN | 102149106 A | 8/2011 |
| CN | 102149108 A | 8/2011 |
| CN | 102215455 A | 10/2011 |
| CN | 102547840 A | 7/2012 |
| CN | 103385017 A | 11/2013 |
| CN | 103561389 A | 2/2014 |
| EP | 2528270 A1 | 11/2012 |
| IN | 102215455 A | 10/2011 |
| WO | 2012047919 A1 | 4/2012 |
| WO | 2012110054 A1 | 8/2012 |
| WO | 2012148202 A2 | 11/2012 |
| WO | 2013074751 A1 | 5/2013 |

OTHER PUBLICATIONS

3GPP TS 36.331 V11.6.0, 3rd Generation Partnership Project; Technical Specification Group Radio Access Network; Evolved Universal Terrestrial Radio Access (E-UTRA); Radio Resource Control (RRC); Protocol specification (Release 11), Dec. 2013, 349 pages.

3GPP TS 36.423 V12.0.0, 3rd Generation Partnership Project; Technical Specification Group Radio Access Network; Evolved Universal Terrestrial Radio Access Network (E-UTRAN); X2 application protocol (X2AP)(Release 12), Dec. 2013, 144 pages.

3GPP TS 37.320 V11.3.0, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11), Mar. 2013, 23 pages.

* cited by examiner

USER EQUIPMENT, NETWORK DEVICE, AND LOGGED MINIMIZATION OF DRIVE TESTS MEASUREMENT METHOD

CROSS-REFERENCE TO RELATED APPLICATIONS

This application is a continuation of International Application No. PCT/CN2014/082473, filed on Jul. 18, 2014, which claims priority to International Patent Application No. PCT/CN2014/070811, filed on Jan. 17, 2014, both of which are hereby incorporated by reference in their entireties.

TECHNICAL FIELD

The present disclosure relates to the communications field, and in particular embodiments, to user equipment (UE), a network device, and a logged minimization of drive tests (MDT) measurement method.

BACKGROUND

In a current wireless communications system, an operator needs to put a lot of manual labor into network planning, deployment, optimization, and maintenance phrases. Especially, in the optimization and the maintenance phrases, to ensure coverage performance of a network, various parameters of the network are collected usually in a manual drive test manner, so as to discover network problems. Such a manner has high costs and low efficiency.

To solve the problems, the 3rd Generation Partnership Project (3GPP) introduces an MDT measurement technology. In the MDT technology, the network and a UE automatically collect measurement information to assist in analysis of the network problems, which reduces workload in the manual drive test and can obtain wireless measurement information of an area that cannot be reached in a common drive test. The MDT measurement may include logged MDT measurement, and the logged MDT measurement refers to that the UE periodically performs the MDT measurement and collects measurement information. The logged MDT measurement makes the analysis of the network problems more efficient; however, there is no specific mechanism for the logged MDT measurement at present.

SUMMARY

Embodiments of the present invention provides a UE, a network device, and a logged MDT measurement method, which can implement logged MDT measurement.

According to a first aspect, a user equipment is provided, including: a receiving unit, configured to receive logged minimization of drive tests MDT configuration information; a determining unit, configured to determine, according to the logged MDT configuration information received by the receiving unit, a Multimedia Broadcast Multicast Service MBMS used for triggering a logged MDT measurement set and a measurement parameter used for performing the logged MDT measurement; and a measuring unit, configured to perform the logged MDT measurement based on the measurement parameter when it is determined that an MBMS used for triggering the logged MDT measurement is being received, where the MBMS used for triggering the logged MDT measurement belongs to the MBMS set used for triggering the logged MDT measurement.

In an implementation of the first aspect, the user equipment further includes: a storage unit, configured to store a public land mobile network PLMN list; and the determining unit is configured to determine, according to the logged MDT configuration information received by the receiving unit and the PLMN list stored by the storage unit, the MBMS set used for triggering the logged MDT measurement, where at least one PLMN of PLMNs to which cells belong is included in the PLMN list stored by the storage unit, where MBMSs in the MBMS set are located in the cells; or a PLMN corresponding to each MBMS in the MBMS set is included in the PLMN list stored by the storage unit.

In an implementation of the first aspect, the measuring unit is further configured to: monitor, when it is determined that receiving of the MBMS used for triggering the logged MDT measurement has not yet started, whether to start receiving the MBMS used for triggering the logged MDT measurement; and perform the logged MDT measurement based on the measurement parameter when monitoring that the receiving of the MBMS used for triggering the logged MDT measurement starts.

In an implementation of the first aspect, the measuring unit is configured to: perform the logged MDT measurement based on the measurement parameter when monitoring in monitoring duration that the receiving of the MBMS used for triggering the logged MDT measurement starts.

In an implementation of the first aspect, the user equipment further includes a releasing unit, configured to release the logged MDT configuration information if the measuring unit has not monitored in the monitoring duration that the receiving of the MBMS used for triggering the logged MDT measurement starts.

In an implementation of the first aspect, the monitoring duration is one of the following items: pre-configured monitoring duration, and monitoring duration indicated in the logged MDT configuration information.

In an implementation of the first aspect, the measuring unit is configured to: if the user equipment is in an idle state, when it is determined that the receiving of the MBMS used for triggering the logged MDT measurement has not yet started, monitor whether to start receiving the MBMS used for triggering the logged MDT measurement.

In an implementation of the first aspect, the measuring unit is configured to: if the user equipment is in the idle state, perform the logged MDT measurement based on the measurement parameter when it is determined that the MBMS used for triggering the logged MDT measurement is being received.

In an implementation of the first aspect, the logged MDT configuration information includes a sending time of the logged MDT configuration information; and the user equipment further includes: a generating unit, configured to generate a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and the sending time of the logged MDT configuration information.

In an implementation of the first aspect, the user equipment further includes: a generating unit, configured to generate a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and a time at which it is monitored that the receiving of the MBMS used for triggering the logged MDT measurement starts.

In an implementation of the first aspect, the logged MDT configuration information includes a sending time of the logged MDT configuration information; and the measurement log further includes a time interval between the time at which it is monitored that the receiving of the MBMS used for triggering the logged MDT measurement starts and the sending time of the logged MDT configuration information.

In an implementation of the first aspect, the logged MDT configuration information includes a Multimedia Broadcast Multicast Service Single Frequency Network MBSFN identifier, and the MBMS set used for triggering the logged MDT measurement includes an MBMS that is transmitted by using an MBSFN indicated by the MBSFN identifier; and the measuring unit is configured to: determine a physical multicast channel PMCH used for transmitting the MBMS used for triggering the logged MDT measurement; determine an MBSFN subframe occupied by the PMCH; and measure, according to the measurement parameter, reference signal received power RSRP or reference signal received quality RSRQ of an MBSFN reference signal transmitted in the MBSFN subframe.

In an implementation of the first aspect, the logged MDT configuration information includes at least one PMCH identifier, and the MBMS set used for triggering the logged MDT measurement includes an MBMS that is transmitted by using a PMCH indicated by each of the at least one PMCH identifier; and the measuring unit is configured to: determine a physical multicast channel PMCH used for transmitting the MBMS used for triggering the logged MDT measurement;

determine an MBSFN subframe occupied by the PMCH; and measure, according to the measurement parameter, reference signal received power RSRP or reference signal received quality RSRQ of an MBSFN reference signal transmitted in the MBSFN subframe.

In an implementation of the first aspect, if the logged MDT configuration information does not include information about the MBMS used for triggering the logged MDT measurement, the MBMS set used for triggering the logged MDT measurement includes any one or multiple MBMSs.

In an implementation of the first aspect, if the logged MDT configuration information does not include information about the MBMS used for triggering the logged MDT measurement, the MBMS set used for triggering the logged MDT measurement includes any one or multiple MBMSs that meet the following condition: at least one PLMN of PLMNs to which cells belong is included in the PLMN list, where MBMSs are located in the cells; or PLMNs corresponding to MBMSs are included in the PLMN list.

In an implementation of the first aspect, the measuring unit is configured to measure, according to the measurement parameter, a packet loss rate of the MBMS used for triggering the logged MDT measurement.

According to a second aspect, a user equipment is provided, including: a receiving unit, configured to receive logged minimization of drive tests MDT configuration information; a determining unit, configured to determine, according to the logged MDT configuration information received by the receiving unit, a Multimedia Broadcast Multicast Service MBMS set used for triggering logged MDT measurement and a measurement parameter used for performing the logged MDT measurement; and a measuring unit, configured to monitor, when it is determined that receiving of an MBMS used for triggering the logged MDT measurement has not yet started, whether to start receiving the MBMS used for triggering the logged MDT measurement; and the measuring unit is configured to: perform the logged MDT measurement based on the measurement parameter when monitoring that the receiving of the MBMS used for triggering the logged MDT measurement starts, where the MBMS used for triggering the logged MDT measurement belongs to the MBMS set used for triggering the logged MDT measurement.

In an implementation of the second aspect, the user equipment further includes: a storage unit, configured to store a public land mobile network PLMN list; and the determining unit is configured to determine, according to the logged MDT configuration information and the public land mobile network PLMN list stored by the storage unit, the MBMS set used for triggering the logged MDT measurement, where at least one PLMN of PLMNs to which cells belong is included in the PLMN list stored by the storage unit, where MBMSs in the MBMS set are located in the cells; or a PLMN corresponding to each MBMS in the MBMS set is included in the PLMN list stored by the storage unit.

In an implementation of the second aspect, the measuring unit is configured to perform the logged MDT measurement based on the measurement parameter when it is monitored in monitoring duration that the receiving of the MBMS used for triggering the logged MDT measurement starts.

In an implementation of the second aspect, the user equipment further includes a releasing unit, configured to release the logged MDT configuration information if the measuring unit has not monitored in the monitoring duration that the receiving of the MBMS used for triggering the logged MDT measurement starts.

In an implementation of the second aspect, the monitoring duration is one of the following items: pre-configured monitoring duration, and monitoring duration indicated in the logged MDT configuration information.

In an implementation of the second aspect, the measuring unit is configured to: if the user equipment is in an idle state, when it is determined that the receiving of the MBMS used for triggering the logged MDT measurement has not yet started, monitor whether to start receiving the MBMS used for triggering the logged MDT measurement.

In an implementation of the second aspect, if the logged MDT configuration information does not include information about the MBMS used for triggering the logged MDT measurement, the MBMS set used for triggering the logged MDT measurement includes any one or multiple MBMSs.

In an implementation of the second aspect, if the logged MDT configuration information does not include information about the MBMS used for triggering the logged MDT measurement, the MBMS set used for triggering the logged MDT measurement includes any one or multiple MBMSs that meet the following condition: at least one PLMN of PLMNs to which cells belong is included in the PLMN list stored by the storage unit, where MBMSs are located in the cells, or PLMNs corresponding to MBMSs are included in the PLMN list stored by the storage unit.

According to a third aspect, a network device is provided, including: a determining unit, configured to determine logged minimization of drive tests MDT configuration information; and a sending unit, configured to send the logged MDT configuration information.

In an implementation of the third aspect, the logged MDT configuration information includes monitoring duration, where the monitoring duration is used by user equipment to monitor whether to start receiving a Multimedia Broadcast Multicast Service MBMS used for triggering logged MDT measurement.

In an implementation of the third aspect, the logged MDT configuration information includes a sending time of the logged MDT configuration information.

In an implementation of the third aspect, the logged MDT configuration information includes at least one of the following items: a Multimedia Broadcast Multicast Service Single Frequency Network MBSFN identifier and at least one physical multicast channel PMCH identifier.

In an implementation of the third aspect, the logged MDT configuration information does not include information about the MBMS used for triggering the logged MDT measurement.

According to a fourth aspect, a logged MDT measurement method is provided, including: receiving, by a user equipment, logged MDT configuration information; determining, by the user equipment according to the logged MDT configuration information, a Multimedia Broadcast Multicast Service MBMS set used for triggering logged MDT measurement and a measurement parameter used for performing the logged MDT measurement; and performing, by the user equipment, the logged MDT measurement based on the measurement parameter when determining that an MBMS used for triggering the logged MDT measurement is being received, where the MBMS used for triggering the logged MDT measurement belongs to the MBMS set used for triggering the logged MDT measurement.

In an implementation of the fourth aspect, the determining, by the user equipment according to the logged MDT configuration information, an MBMS set used for triggering a logged MDT measurement includes: determining, by the user equipment according to the logged MDT configuration information and a public land mobile network PLMN list stored by the user equipment, the MBMS set used for triggering the logged MDT measurement, where at least one PLMN of PLMNs to which cells belong is included in the PLMN list, where MBMSs in the MBMS set are located in the cells; or a PLMN corresponding to each MBMS in the MBMS set is included in the PLMN list.

In an implementation of the fourth aspect, the method further includes: monitoring, by the user equipment when determining that receiving of the MBMS used for triggering the logged MDT measurement has not yet started, whether to start receiving the MBMS used for triggering the logged MDT measurement; and performing, by the user equipment, the logged MDT measurement based on the measurement parameter when monitoring that the receiving of the MBMS used for triggering the logged MDT measurement starts.

In an implementation of the fourth aspect, the performing, by the user equipment, the logged MDT measurement based on the measurement parameter when monitoring that the receiving of the MBMS used for triggering the logged MDT measurement starts includes: performing, by the user equipment, the logged MDT measurement based on the measurement parameter when monitoring in monitoring duration that the receiving of the MBMS used for triggering the logged MDT measurement starts.

In an implementation of the fourth aspect, the method further includes: releasing the logged MDT configuration information if the user equipment has not monitored in the monitoring duration that the receiving of the MBMS used for triggering the logged MDT measurement starts.

In an implementation of the fourth aspect, the monitoring duration is one of the following items: pre-configured monitoring duration, and monitoring duration indicated in the logged MDT configuration information.

In an implementation of the fourth aspect, the monitoring, by the user equipment when determining that receiving of the MBMS used for triggering the logged MDT measurement has not yet started, whether to start receiving the MBMS used for triggering the logged MDT measurement includes: if the user equipment is in an idle state, when it is determined that the receiving of the MBMS used for triggering the logged MDT measurement has not yet started, monitoring, by the user equipment, whether to start receiving the MBMS used for triggering the logged MDT measurement.

In an implementation of the fourth aspect, the performing, by the user equipment, the logged MDT measurement based on the measurement parameter when determining that an MBMS used for triggering the logged MDT measurement is being received includes: when the user equipment is in the idle state, performing, by the user equipment, the logged MDT measurement based on the measurement parameter when determining that the MBMS used for triggering the logged MDT measurement is being received.

In an implementation of the fourth aspect, the logged MDT configuration information includes a sending time of the logged MDT configuration information; and the method further includes: generating, by the user equipment, a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and the sending time of the logged MDT configuration information.

In an implementation of the fourth aspect, the method further includes: generating, by the user equipment, a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and a time at which it is monitored that the receiving of the MBMS used for triggering the logged MDT measurement starts.

In an implementation of the fourth aspect, the logged MDT configuration information includes a sending time of the logged MDT configuration information; and the measurement log further includes a time interval between the time at which it is monitored that the receiving of the MBMS used for triggering the logged MDT measurement starts and the sending time of the logged MDT configuration information.

In an implementation of the fourth aspect, the logged MDT configuration information includes a Multimedia Broadcast Multicast Service Single Frequency Network MBSFN identifier, and the MBMS set used for triggering the logged MDT measurement includes an MBMS that is transmitted by using an MBSFN indicated by the MBSFN identifier; and the performing the logged MDT measurement based on the measurement parameter includes: determining a physical multicast channel PMCH used for transmitting the MBMS used for triggering the logged MDT measurement; determining an MBSFN subframe occupied by the PMCH; and measuring, according to the measurement parameter, reference signal received power RSRP or reference signal received quality RSRQ of an MBSFN reference signal transmitted in the MBSFN subframe.

In an implementation of the fourth aspect, the logged MDT configuration information includes at least one PMCH identifier, and the MBMS set used for triggering the logged MDT measurement includes an MBMS that is transmitted by using a PMCH indicated by each of the at least one PMCH identifier; and determining a physical multicast channel PMCH used for transmitting the MBMS used for triggering the logged MDT measurement;

determining an MBSFN subframe occupied by the PMCH; and measuring, according to the measurement parameter, reference signal received power RSRP or reference signal received quality RSRQ of an MBSFN reference signal transmitted in the MBSFN subframe.

In an implementation of the fourth aspect, if the logged MDT configuration information does not include information about the MBMS used for triggering the logged MDT measurement, the MBMS set used for triggering the logged MDT measurement includes any one or multiple MBMSs.

In an implementation of the fourth aspect, if the logged MDT configuration information does not include information about the MBMS used for triggering the logged MDT measurement, the MBMS set used for triggering the logged MDT measurement includes any one or multiple MBMSs that meet the following condition: at least one PLMN of PLMNs to which cells belong is included in the PLMN list, where MBMSs are located in the cells; or PLMNs corresponding to MBMSs are included in the PLMN list.

In an implementation of the fourth aspect, the performing the logged MDT measurement based on the measurement parameter includes: measuring, according to the measurement parameter, a packet loss rate of the MBMS used for triggering the logged MDT measurement.

According to a fifth aspect, a logged MDT measurement method is provided, including: receiving, by a user equipment, logged MDT configuration information; determining, by the user equipment according to the logged MDT configuration information, a Multimedia Broadcast Multicast Service MBMS set used for triggering logged MDT measurement and a measurement parameter used for performing the logged MDT measurement; monitoring, by the user equipment when determining that receiving of an MBMS used for triggering the logged MDT measurement has not yet started, whether to start receiving the MBMS used for triggering the logged MDT measurement; and performing, by the user equipment, the logged MDT measurement based on the measurement parameter when monitoring that the receiving of the MBMS used for triggering the logged MDT measurement starts, where the MBMS used for triggering the logged MDT measurement belongs to the MBMS set used for triggering the logged MDT measurement.

In an implementation of the fifth aspect, the determining, by the user equipment according to the logged MDT configuration information, a Multimedia Broadcast Multicast Service MBMS set used for triggering a logged MDT measurement includes: determining, by the user equipment according to the logged MDT configuration information and a public land mobile network PLMN list stored by the user equipment, the MBMS set used for triggering the logged MDT measurement, where at least one PLMN of PLMNs to which cells belong is included in the PLMN list, where MBMSs in the MBMS set are located in the cells; or a PLMN corresponding to each MBMS in the MBMS set is included in the PLMN list.

In an implementation of the fifth aspect, the performing, by the user equipment, the logged MDT measurement based on the measurement parameter when monitoring that the receiving of the MBMS used for triggering the logged MDT measurement starts includes: performing, by the user equipment, the logged MDT measurement based on the measurement parameter when monitoring in monitoring duration that the receiving of the MBMS used for triggering the logged MDT measurement starts.

In an implementation of the fifth aspect, the method further includes releasing the logged MDT configuration information if the user equipment has not monitored in the monitoring duration that the receiving of the MBMS used for triggering the logged MDT measurement starts.

In an implementation of the fifth aspect, the monitoring duration is one of the following items: pre-configured monitoring duration, and monitoring duration indicated in the logged MDT configuration information.

In an implementation of the fifth aspect, the monitoring, by the user equipment when determining that receiving of an MBMS used for triggering the logged MDT measurement has not yet started, whether to start receiving the MBMS used for triggering the logged MDT measurement includes: when the user equipment is in an idle state, when determining that the receiving of the MBMS used for triggering the logged MDT measurement has not yet started, monitoring, by the user equipment, whether to start receiving the MBMS used for triggering the logged MDT measurement.

In an implementation of the fifth aspect, if the logged MDT configuration information does not include information about the MBMS used for triggering the logged MDT measurement, the MBMS set used for triggering the logged MDT measurement includes any one or multiple MBMSs.

In an implementation of the fifth aspect, if the logged MDT configuration information does not include information about the MBMS used for triggering the logged MDT measurement, the MBMS set used for triggering the logged MDT measurement includes any one or multiple MBMSs that meet the following condition: at least one PLMN of PLMNs to which cells belong is included in the PLMN list, where MBMSs are located in the cells; or PLMNs corresponding to MBMSs are included in the PLMN list.

According to a sixth aspect, a logged MDT measurement method is provided, including: determining, by a network device, logged minimization of drive tests MDT configuration information; and sending, by the network device, the logged MDT configuration information.

In an implementation of the sixth aspect, the logged MDT configuration information includes monitoring duration, where the monitoring duration is used by user equipment to monitor whether to start receiving a Multimedia Broadcast Multicast Service MBMS used for triggering logged MDT measurement.

In an implementation of the sixth aspect, the logged MDT configuration information includes a sending time of the logged MDT configuration information.

In an implementation of the sixth aspect, the logged MDT configuration information includes at least one of the following items: a Multimedia Broadcast Multicast Service Single Frequency Network MBSFN identifier and at least one physical multicast channel PMCH identifier.

In an implementation of the sixth aspect, the logged MDT configuration information does not include information about the MBMS used for triggering the logged MDT measurement.

In the embodiments of the present invention, an MBMS set used for triggering logged MDT measurement and a measurement parameter used for performing the logged MDT measurement are determined according to logged MDT configuration information, and the logged MDT measurement is performed based on the measurement parameter when it is determined that an MBMS belonging to the set is being received, thereby implementing the logged MDT measurement.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present disclosure.

The technical solutions of the present disclosure may be applied to various communications systems, such as: a Global System for Mobile Communications (GSM), a Code Division Multiple Access (CDMA) system, a Wideband Code Division Multiple Access (WCDMA), a general packet radio service (GPRS) system, a Long Term Evolution (LTE) system, and a Universal Mobile Telecommunications System (UMTS).

In this embodiment of the present invention, a UE may also be referred to as a mobile terminal (MT), a mobile user equipment, and the like, and may communicate with one or more core networks through a radio access network (for example, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

In a different communications system, a network device in the embodiments of the present invention may be a different device. For example, the network device may be a base station controller (BSC), a radio network controller (RNC), an evolved NodeB (eNB or e-NodeB) in the LTE system, a base station (NodeB) in the WCDMA system, or the like.

Figure 1:
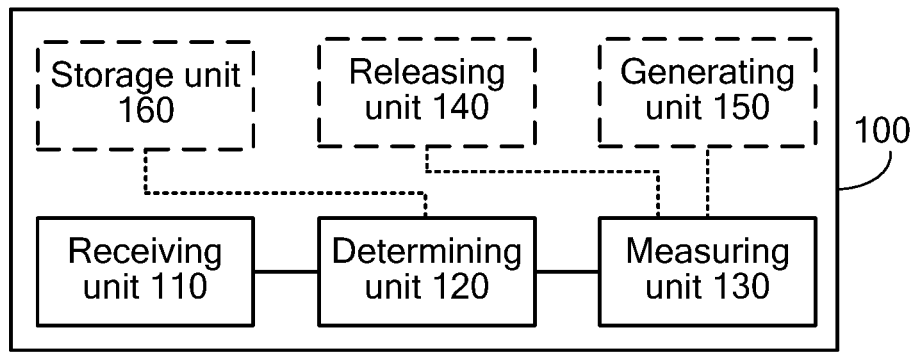
FIG. 1 is a schematic block diagram of a UE according to an embodiment of the present invention.

FIG. 1 is a schematic block diagram of a UE according to an embodiment of the present invention. A UE 100 in FIG. 1 includes a receiving unit 110, a determining unit 120, and a control unit 130.

The receiving unit 110 receives logged MDT configuration information. The determining unit 120 determines, according to the logged MDT configuration information received by the receiving unit 110, a Multimedia Broadcast Multicast Service (MBMS) set used for triggering logged MDT measurement and a measurement parameter used for performing the logged MDT measurement. The measuring unit 130 performs the logged MDT measurement based on the measurement parameter when it is determined that an MBMS used for triggering the logged MDT measurement is being received, where the MBMS used for triggering the logged MDT measurement belongs to the MBMS set used for triggering the logged MDT measurement.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is determined that an MBMS used for triggering the logged MDT measurement is being received, thereby implementing the logged MDT measurement.

Optionally, as another embodiment, the UE may further include a storage unit 160. The storage unit 160 may store a public land mobile network (PLMN) list. The determining unit 120 is configured to determine, according to the logged MDT configuration information received by the receiving unit 110 and the PLMN list stored by the storage unit 160, the MBMS set used for triggering the logged MDT measurement, where at least one PLMN of PLMNs to which cells belong is included in the PLMN list stored by the storage unit 160, where MBMSs in the MBMS set are located in the cells; or a PLMN corresponding to each MBMS in the MBMS set is included in the PLMN list stored by the storage unit 160.

Optionally, as an embodiment, the measuring unit 130 may monitor, when it is determined that receiving of the MBMS used for triggering the logged MDT measurement has not yet started, whether to start receiving the MBMS used for triggering the logged MDT measurement.

The measuring unit 130 may further perform the logged MDT measurement based on the measurement parameter when monitoring that the receiving of the MBMS used for triggering the logged MDT measurement starts.

Optionally, as another embodiment, the measuring unit 130 may perform the logged MDT measurement based on the measurement parameter when monitoring in monitoring duration that the receiving of the MBMS used for triggering the logged MDT measurement starts.

Optionally, as another embodiment, the UE may further include a releasing unit 140. If the measuring unit 130 has not monitored in the monitoring duration that the receiving of the MBMS used for triggering the logged MDT measurement starts, the releasing unit 140 may release the logged MDT configuration information.

Optionally, as another embodiment, the monitoring duration may be one of the following items: pre-configured monitoring duration, and monitoring duration indicated in the logged MDT configuration information.

Optionally, as another embodiment, when the UE 100 is in an idle state, the determining unit 120 may determine, according to the logged MDT configuration information, the Multimedia Broadcast Multicast Service MBMS set used for triggering the logged MDT measurement and the measurement parameter used for performing the logged MDT measurement.

Optionally, as another embodiment, if the UE 100 is in an idle state, the measuring unit 120 may monitor, when it is determined that the receiving of the MBMS used for triggering the logged MDT measurement has not yet started, whether to start receiving the MBMS used for triggering the logged MDT measurement.

Optionally, as another embodiment, if the UE 100 is in an idle state, the measuring unit 120 performs the logged MDT measurement based on the measurement parameter when it is determined that the MBMS used for triggering the logged MDT measurement is being received.

Optionally, as another embodiment, the logged MDT configuration information may include a sending time of the logged MDT configuration information.

The UE may further include a generating unit 150.

The generating unit 150 may generate a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and the sending time of the logged MDT configuration information.

Optionally, as another embodiment, if the measuring unit 130 performs the logged MDT measurement based on the measurement parameter when monitoring in the monitoring duration that the receiving of the MBMS used for triggering the logged MDT measurement starts, the generating unit 150 may generate a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and a time at which it is monitored that the receiving of the MBMS used for triggering the logged MDT measurement starts.

For example, the time at which it is monitored that the receiving of the MBMS used for triggering the logged MDT measurement starts may be determined by the measuring unit 130 by means of continuous monitoring. Alternatively, when starting receiving the MBMS used for triggering the logged MDT measurement, the receiving unit 110 notifies the measuring unit 130 of a time at which the receiving of the MBMS used for triggering the logged MDT measurement starts, that is, the time at which it is monitored that the receiving of the MBMS used for triggering the logged MDT measurement starts may be notified by the receiving unit 110 to the measuring unit 130.

Optionally, as another embodiment, the logged MDT configuration information may include a sending time of the logged MDT configuration information. The measurement log may further include a time interval between the time at which it is monitored that the receiving of the MBMS used for triggering the logged MDT measurement starts and the sending time of the logged MDT configuration information.

Optionally, as another embodiment, the logged MDT configuration information includes a Multimedia Broadcast Multicast Service Single Frequency Network (MBSFN) identifier, and the MBMS set used for triggering the logged MDT measurement includes an MBMS that is transmitted by using an MBSFN indicated by the MBSFN identifier.

The measuring unit 130 may determine a physical multicast channel (PMCH) used for transmitting the MBMS used for triggering the logged MDT measurement; determine an MBSFN subframe occupied by the PMCH; and measure, according to the measurement parameter, reference signal received power (RSRP) or reference signal received quality (RSRQ) of an MBSFN reference signal transmitted in the MBSFN subframe.

Optionally, as another embodiment, the logged MDT configuration information may include at least one PMCH identifier, and the MBMS set used for triggering the logged MDT measurement includes an MBMS that is transmitted by using a PMCH indicated by each of the at least one PMCH identifier.

The measuring unit 130 may determine a physical multicast channel PMCH used for transmitting the MBMS used for triggering the logged MDT measurement; determine an MBSFN subframe occupied by the PMCH; and measure, according to the measurement parameter, reference signal received power RSRP or reference signal received quality RSRQ of an MBSFN reference signal transmitted in the MBSFN subframe.

Optionally, as another embodiment, the logged MDT configuration information may include at least one MBMS identifier. The MBMS set used for triggering the logged MDT measurement may include an MBMS indicated by each of the at least one MBMS identifier. The measuring unit 130 may determine an MBSFN subframe in which the MBMS used for triggering the logged MDT measurement is located, and may measure, according to the measurement parameter, RSRP or RSRQ of an MBSFN reference signal transmitted in the MBSFN subframe.

Optionally, as another embodiment, the logged MDT configuration information may not include information about the MBMS used for triggering the logged MDT measurement. Correspondingly, the MBMS set used for triggering the logged MDT measurement may include any one or multiple MBMSs; in this case, the MBMS used for triggering the logged MDT measurement may be any one MBMS received by the UE.

For example, if the logged MDT configuration information does not include the MBSFN identifier, the PMCH identifier, and the MBMS identifier, the MBMS used for triggering the logged MDT measurement may be any one MBMS received by the UE.

Optionally, as another embodiment, the logged MDT configuration information may not include information about the MBMS used for triggering the logged MDT measurement, and then the MBMS set used for triggering the logged MDT measurement includes any or multiple MBMSs that meet the following condition: at least one PLMN of PLMNs to which cells belong is included in the PLMN list stored by the storage unit 160, where MBMSs are located in the cells; or PLMNs corresponding to MBMSs are included in the PLMN list stored by the storage unit 160.

Optionally, as another embodiment, the measuring unit 130 may measure, according to the measurement parameter, a packet loss rate of the MBMS used for triggering the logged MDT measurement.

Figure 5:
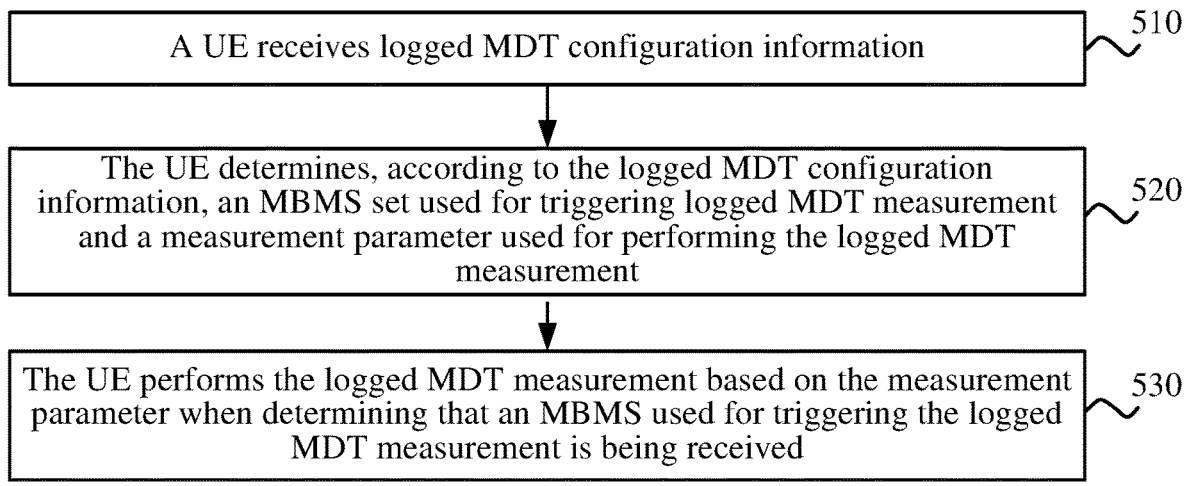
FIG. 5 is a schematic flowchart of a logged MDT measurement method according to an embodiment of the present invention.

The UE 100 may execute a process of a method embodiment in FIG. 5. Therefore, reference may be made to the process in FIG. 5 for specific functions and operations of the UE 100, and the details are not described herein again.

Figure 2A:
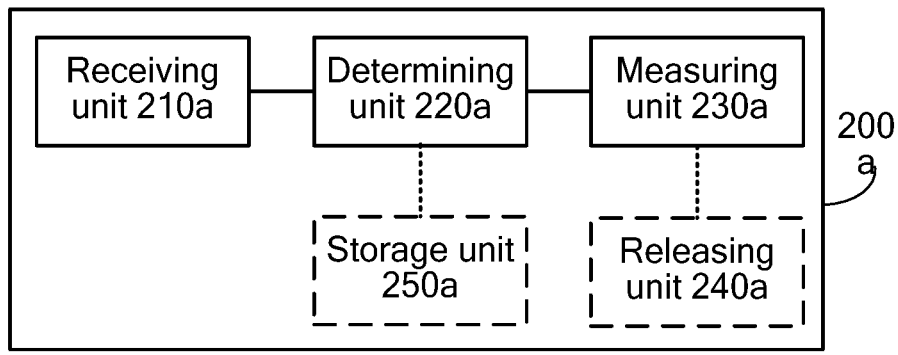
FIG. 2a is a schematic block diagram of a UE according to another embodiment of the present invention.

FIG. 2a is a schematic block diagram of a UE according to another embodiment of the present invention. A UE 200a in FIG. 2a includes a receiving unit 210a, a determining unit 220a, and a measuring unit 230a.

The receiving unit 210a receives logged minimization of drive tests MDT configuration information. The determining unit 220a determines, according to the logged MDT configuration information received by the receiving unit 210a, an MBMS set used for triggering logged MDT measurement and a measurement parameter used for performing the logged MDT measurement. The measuring unit 230a monitors, when it is determined that receiving of an MBMS used for triggering the logged MDT measurement has not yet started, whether to start receiving the MBMS used for triggering the logged MDT measurement. The measuring unit 230a further performs the logged MDT measurement based on the measurement parameter when monitoring that the receiving of the MBMS used for triggering the logged MDT measurement starts, where the MBMS used for triggering the logged MDT measurement belongs to the MBMS set used for triggering the logged MDT measurement.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is monitored that receiving of an MBMS belonging to the set starts, thereby implementing the logged MDT measurement.

Optionally, as another embodiment, the UE may further include a storage unit 250a. The storage unit 250a is configured to store a public land mobile network PLMN list. The determining unit 220a is configured to determine, according to the logged MDT configuration information received by the receiving unit 210a and the PLMN list stored by the storage unit 250a, the MBMS set used for triggering the logged MDT measurement, where at least one PLMN of PLMNs to which cells belong is included in the PLMN list stored by the storage unit 250a, where MBMSs in the MBMS set are located in the cells; or a PLMN corresponding to each MBMS in the MBMS set is included in the PLMN list stored by the storage unit 250a.

Optionally, as an embodiment, the measuring unit 230a may perform the logged MDT measurement based on the measurement parameter when it is monitored in monitoring duration that the receiving of the MBMS used for triggering the logged MDT measurement starts.

Optionally, as another embodiment, the UE may further include a releasing unit 240a.

If the measuring unit 230a has not monitored in the monitoring duration that the receiving of the MBMS used for triggering the logged MDT measurement starts, the releasing unit 240a may release the logged MDT configuration information.

Optionally, as another embodiment, the monitoring duration may be one of the following items: pre-configured monitoring duration, and monitoring duration indicated in the logged MDT configuration information.

Optionally, as another embodiment, when the UE is in an idle state, the determining unit 220a may determine, according to the logged MDT configuration information, the MBMS set used for triggering the logged MDT measurement and the measurement parameter used for performing the logged MDT measurement.

Optionally, as another embodiment, if the UE 200a is in an idle state, the measuring unit 230a may monitor, when it is determined that the receiving of the MBMS used for triggering the logged MDT measurement has not yet started, whether to start receiving the MBMS used for triggering the logged MDT measurement.

Optionally, as another embodiment, the logged MDT configuration information may not include information about the MBMS used for triggering the logged MDT measurement, and then the MBMS set used for triggering the logged MDT measurement includes any one or multiple MBMSs. In this case, the MBMS used for triggering the logged MDT measurement may be any MBMS received by the UE.

Optionally, as another embodiment, the logged MDT configuration information may not include information about the MBMS used for triggering the logged MDT measurement, and then the MBMS set used for triggering the logged MDT measurement includes any one or multiple MBMSs that meet the following condition: at least one PLMN of PLMNs to which cells belong is included in the PLMN list stored by the storage unit 250a, where MBMSs are located in the cells; or PLMNs corresponding to MBMSs are included in the PLMN list stored by the storage unit 250a.

Figure 6A:
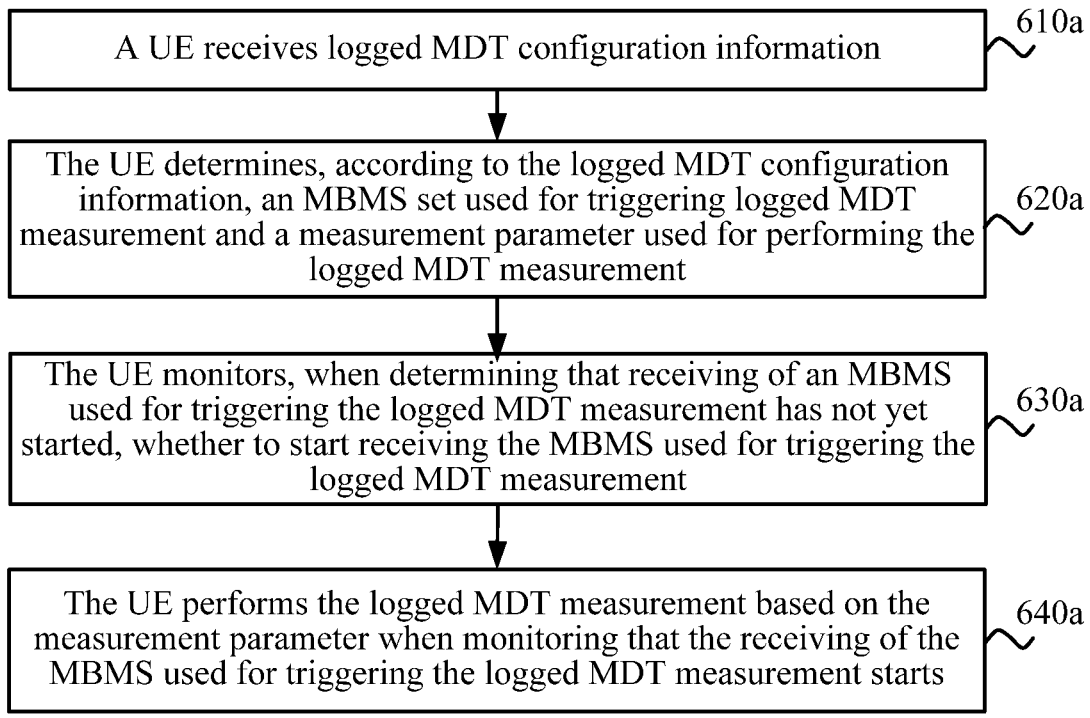
FIG. 6a is a schematic flowchart of a logged MDT measurement method according to another embodiment of the present invention.

The UE 200a may execute a process of a method embodiment in FIG. 6a. Therefore, reference may be made to the process in FIG. 6a for specific functions and operations of the UE 200a, and the details are not described herein again.

Figure 2B:
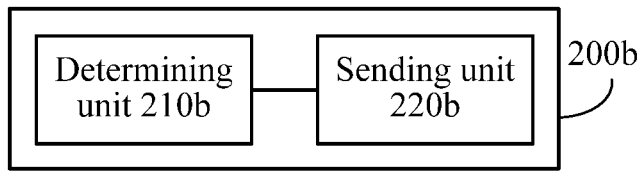
FIG. 2b is a schematic block diagram of a network device according to an embodiment of the present invention.

FIG. 2b is a schematic block diagram of a network device according to an embodiment of the present invention. A network device 200b in FIG. 2b includes a determining unit 210b and a sending unit 220b.

The determining unit 210b determines logged MDT configuration information. The sending unit 220 sends the logged MDT configuration information.

In this embodiment of the present invention, after the sending unit sends the logged MDT configuration information, a UE can perform logged MDT measurement according to the logged MDT configuration information, thereby implementing the logged MDT measurement.

Optionally, as an embodiment, the logged MDT configuration information may include monitoring duration, and the monitoring duration is used by the UE to monitor whether to start receiving an MBMS used for triggering logged MDT measurement.

Optionally, as another embodiment, the logged MDT configuration information may include a sending time of the logged MDT configuration information.

Optionally, as another embodiment, the logged MDT configuration information may include at least one of the following items: an MBSFN identifier and at least one PMCH identifier.

Optionally, as another embodiment, the logged MDT configuration information may not include information about the MBMS used for triggering the logged MDT measurement, which means that the MBMS used for triggering the logged MDT measurement may be any MBMS received by the UE, or the MBMS used for triggering the logged MDT measurement may be any MBMS that meets the following condition: at least one PLMN of PLMNs to which cells belong is included in a PLMN list stored by the UE, where MBMSs are located in the cells; or a PLMN corresponding to each MBMS in the MBMS set is included in a PLMN list stored by the UE.

Figure 6B:
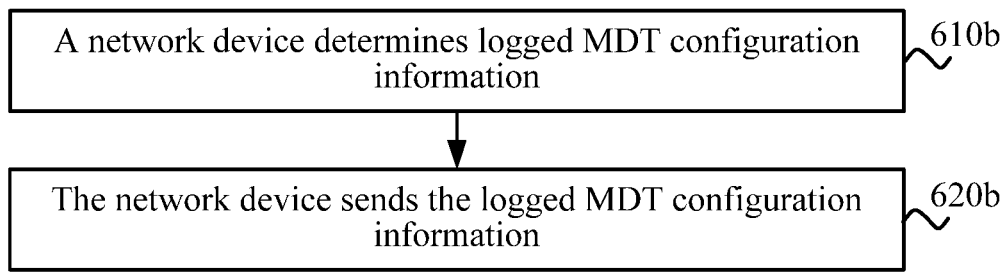
FIG. 6b is a schematic flowchart of a logged MDT measurement method according to another embodiment of the present invention.

The network device 200b may execute a process of a method embodiment in FIG. 6b. Therefore, reference may be made to the process in FIG. 6b for specific functions and operations of the network device 200b, and the details are not described herein again.

Figure 3:
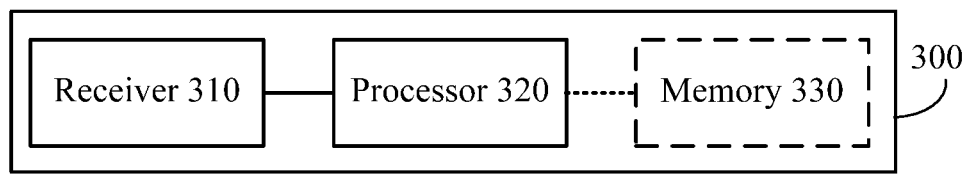
FIG. 3 is a schematic block diagram of a UE according to another embodiment of the present invention.

FIG. 3 is a schematic block diagram of a UE according to another embodiment of the present invention. A UE 300 includes a receiver 310 and a processor 320.

The receiver 310 receives logged MDT configuration information. The processor 320 determines, according to the logged MDT configuration information received by the receiver 310, an MBMS set used for triggering logged MDT measurement and a measurement parameter used for performing the logged MDT measurement, and performs the logged MDT measurement based on the measurement parameter when it is determined that an MBMS used for triggering the logged MDT measurement is being received, where the MBMS used for triggering the logged MDT measurement belongs to the MBMS set used for triggering the logged MDT measurement.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is determined that an MBMS used for triggering the logged MDT measurement is being received, thereby implementing the logged MDT measurement.

Optionally, as another embodiment, the UE 300 may further include a memory 330. The memory 330 stores a public land mobile network PLMN list. The processor 320 is configured to determine, according to the logged MDT configuration information received by the receiver 310 and the PLMN list stored by the memory 330, the MBMS set used for triggering the logged MDT measurement, where at least one PLMN of PLMNs to which cells belong is included in the PLMN list stored by the memory 330, where MBMSs in the MBMS set are located in the cells; or a PLMN corresponding to each MBMS in the MBMS set is included in the PLMN list stored by the memory 330.

Optionally, as an embodiment, the processor 320 may monitor, when it is determined that receiving of the MBMS used for triggering the logged MDT measurement has not yet started, whether to start receiving the MBMS used for triggering the logged MDT measurement. The processor 320 may perform the logged MDT measurement based on the measurement parameter when monitoring that the receiving of the MBMS used for triggering the logged MDT measurement starts.

Optionally, as another embodiment, the processor 320 may perform the logged MDT measurement based on the measurement parameter when monitoring in monitoring duration that the receiving of the MBMS used for triggering the logged MDT measurement starts.

Optionally, as another embodiment, if the processor 320 has not monitored in the monitoring duration that the receiving of the MBMS used for triggering the logged MDT measurement starts, the processor 320 may release the logged MDT configuration information.

Optionally, as another embodiment, the monitoring duration may be one of the following items: pre-configured monitoring duration, and monitoring duration indicated in the logged MDT configuration information.

Optionally, as another embodiment, when the UE 300 is in an idle state, the processor 320 may determine, according to the logged MDT configuration information, the Multimedia Broadcast Multicast Service MBMS set used for triggering the logged MDT measurement and the measurement parameter used for performing the logged MDT measurement.

Optionally, as another embodiment, if the UE 300 is in an idle state, the processor 320 may monitor, when it is determined that the receiving of the MBMS used for triggering the logged MDT measurement has not yet started, whether to start receiving the MBMS used for triggering the logged MDT measurement.

Optionally, as another embodiment, if the UE 300 is in an idle state, the processor 320 may perform the logged MDT measurement based on the measurement parameter when it is determined that the MBMS used for triggering the logged MDT measurement is being received.

Optionally, as another embodiment, the logged MDT configuration information may include a sending time of the logged MDT configuration information.

The processor 320 may generate a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and the sending time of the logged MDT configuration information.

Optionally, as another embodiment, if the processor 320 performs the logged MDT measurement based on the measurement parameter when monitoring in the monitoring duration that the receiving of the MBMS used for triggering the logged MDT measurement starts, the processor 320 may generate a measurement log of the logged MDT measurement, where the measurement log includes at least one measurement result recorded during the logged MDT measurement and a relative time corresponding to each measurement result in the at least one measurement result, where the relative time corresponding to each measurement result is a time interval between a recording time of the measurement result and a time at which it is monitored that the receiving of the MBMS used for triggering the logged MDT measurement starts.

Optionally, as another embodiment, the logged MDT configuration information may include a sending time of the logged MDT configuration information. The measurement log may further include a time interval between the time at which it is monitored that the receiving of the MBMS used for triggering the logged MDT measurement starts and the sending time of the logged MDT configuration information.

Optionally, as another embodiment, the logged MDT configuration information includes an MBSFN identifier, and the MBMS used for triggering the logged MDT measurement is an MBMS that is transmitted by using an MBSFN indicated by the MBSFN identifier.

The processor 320 may determine a PMCH used for transmitting the MBMS used for triggering the logged MDT measurement; determine an MBSFN subframe occupied by the PMCH; and measure, according to the measurement parameter, reference signal received power RSRP or reference signal received quality RSRQ of an MBSFN reference signal transmitted in the MBSFN subframe.

Optionally, as another embodiment, the logged MDT configuration information may include at least one PMCH identifier, and the MBMS set used for triggering the logged MDT measurement includes an MBMS that is transmitted by using a PMCH indicated by each of the at least one PMCH identifier.

The processor 320 may determine a physical multicast channel PMCH used for transmitting the MBMS used for triggering the logged MDT measurement; determine an MBSFN subframe occupied by the PMCH; and measure, according to the measurement parameter, reference signal received power RSRP or reference signal received quality RSRQ of an MBSFN reference signal transmitted in the MBSFN subframe.

Optionally, as another embodiment, the logged MDT configuration information may not include information about the MBMS used for triggering the logged MDT measurement, and then the MBMS set used for triggering the logged MDT measurement may include any one or multiple MBMSs. In this case, the MBMS used for triggering the logged MDT measurement may be any MBMS received by the UE.

Optionally, as another embodiment, the logged MDT configuration information may not include information about the MBMS used for triggering the logged MDT measurement, and then the MBMS set used for triggering the logged MDT measurement may include any one or multiple MBMSs that meet the following condition: at least one PLMN of PLMNs to which cells belong is included in the PLMN list stored by the memory 330, where MBMSs are located in the cells; or a PLMN corresponding to each MBMS in the MBMS set is included in the PLMN list stored by the memory 330.

Optionally, as another embodiment, the processor 320 may measure, according to the measurement parameter, a packet loss rate of the MBMS used for triggering the logged MDT measurement.

The UE 300 may execute a process of a method embodiment in FIG. 5. Therefore, reference may be made to the process in FIG. 5 for specific functions and operations of the UE 300, and the details are not described herein again.

Figure 4A:
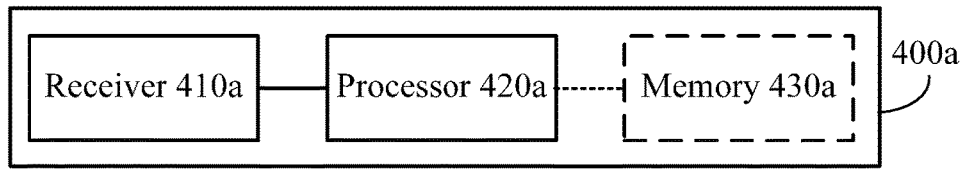
FIG. 4a is a schematic block diagram of a UE according to another embodiment of the present invention.

FIG. 4a is a schematic block diagram of a UE according to another embodiment of the present invention. A UE 400a in FIG. 4a includes a receiver 410a and a processor 420a.

The receiver 410a receives logged minimization of drive tests MDT configuration information. The processor 420a determines, according to the logged MDT configuration information received by the receiver 410a, an MBMS set used for triggering logged MDT measurement and a measurement parameter used for performing the logged MDT measurement. The processor 420a monitors, when it is determined that receiving of an MBMS used for triggering the logged MDT measurement has not yet started, whether to start receiving the MBMS used for triggering the logged MDT measurement. The processor 420a performs the logged MDT measurement based on the measurement parameter when monitoring that the receiving of the MBMS used for triggering the logged MDT measurement starts.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is monitored that receiving of an MBMS used for triggering the logged MDT measurement starts, thereby implementing the logged MDT measurement.

Optionally, as another embodiment, the UE 400a may further include a memory 430a. The memory 430a may store a PLMN list. The processor 420a is configured to determine, according to the logged MDT configuration information received by the receiver 410a and the PLMN list stored by the memory 430a, the MBMS set used for triggering the logged MDT measurement, where at least one PLMN of PLMNs to which cells belong is included in the PLMN list stored by the memory 430a, where MBMSs in the MBMS set are located in the cells; or a PLMN corresponding to each MBMS in the MBMS set is included in the PLMN list stored by the memory 430a.

Optionally, as an embodiment, the processor 420a may perform the logged MDT measurement based on the measurement parameter when it is monitored in monitoring duration that the receiving of the MBMS used for triggering the logged MDT measurement starts.

Optionally, as another embodiment, if the processor 420a has not monitored in the monitoring duration that the receiving of the MBMS used for triggering the logged MDT measurement starts, the processor 420a may release the logged MDT configuration information.

Optionally, as another embodiment, the monitoring duration may be one of the following items: pre-configured monitoring duration, and monitoring duration indicated in the logged MDT configuration information.

Optionally, as another embodiment, when the UE is in an idle state, the processor 420a may determine, according to the logged MDT configuration information, the MBMS set used for triggering the logged MDT measurement and the measurement parameter used for performing the logged MDT measurement.

Optionally, as another embodiment, if the UE 400a is in an idle state, the processor 420a may monitor, when it is determined that the receiving of the MBMS used for triggering the logged MDT measurement has not yet started, whether to start receiving the MBMS used for triggering the logged MDT measurement.

Optionally, as another embodiment, the logged MDT configuration information may not include information about the MBMS used for triggering the logged MDT measurement, and then the MBMS set used for triggering the logged MDT measurement includes any one or multiple MBMSs. In this case, the MBMS used for triggering the logged MDT measurement may be any MBMS received by the UE.

Optionally, as another embodiment, the logged MDT configuration information may not include information about the MBMS used for triggering the logged MDT measurement, and then the MBMS set used for triggering the logged MDT measurement includes any one or multiple MBMSs that meet the following condition: at least one PLMN of PLMNs to which cells belong is included in the PLMN list stored by the memory 430a, where MBMSs are located in the cells; or PLMNs corresponding to MBMSs are included in the PLMN list stored by the memory 430a.

The UE 400a may execute a process of a method embodiment in FIG. 6a. Therefore, reference may be made to the process in FIG. 6a for specific functions and operations of the UE 400a, and the details are not described herein again.

Figure 4B:
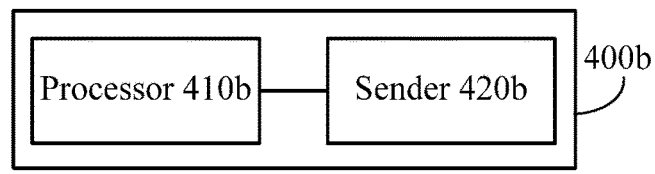
FIG. 4b is a schematic block diagram of a network device according to another embodiment of the present invention.

FIG. 4b is a schematic block diagram of a network device according to another embodiment of the present invention. A network device 400b in FIG. 4b includes a processor 410b and a sender 420b.

The processor 410 determines logged MDT configuration information. The sender 420 sends the logged MDT configuration information.

In this embodiment of the present invention, after the sender sends the logged MDT configuration information, a UE can perform logged MDT measurement according to the logged MDT configuration information, thereby implementing the logged MDT measurement.

Optionally, as an embodiment, the logged MDT configuration information may include monitoring duration, and the monitoring duration is used by the UE to monitor whether to start receiving an MBMS used for triggering logged MDT measurement.

Optionally, as another embodiment, the logged MDT configuration information may include a sending time of the logged MDT configuration information.

Optionally, as another embodiment, the logged MDT configuration information may include at least one of the following items: an MBSFN identifier and at least one PMCH identifier.

Optionally, as another embodiment, the logged MDT configuration information may not include information about the MBMS used for triggering the logged MDT measurement, which means that the MBMS used for triggering the logged MDT measurement may be any MBMS received by the UE, or the MBMS used for triggering the logged MDT measurement may be any MBMS that meets the following condition: at least one PLMN of PLMNs to which cells belong is included in a PLMN list stored by the UE, where MBMSs are located in the cells; or a PLMN corresponding to each MBMS in the MBMS set is included in a PLMN list stored by the UE.

The network device 400b may execute a process of a method embodiment in FIG. 6b. Therefore, reference may be made to the process in FIG. 6b for specific functions and operations of the network device 400b, and the details are not described herein again.

FIG. 5 is a schematic flowchart of a logged MDT measurement method according to an embodiment of the present invention. The method in FIG. 5 is executed by a UE.

510. The UE receives logged MDT configuration information.

520. The UE determines, according to the logged MDT configuration information, an MBMS set used for triggering logged MDT measurement and a measurement parameter used for performing the logged MDT measurement.

530. The UE performs the logged MDT measurement based on the measurement parameter when determining that an MBMS used for triggering the logged MDT measurement is being received, where the MBMS used for triggering the logged MDT measurement belongs to the MBMS set used for triggering the logged MDT measurement.

In a logged MDT measurement technology provided in 3GPP, it is stipulated that a UE may immediately perform logged MDT measurement after entering an idle state. However, in an MBSFN area, the UE probably has not started receiving of an MBMS service after leaving a connected state, and therefore cannot immediately perform the logged MDT measurement for the MBSFN area. Therefore, a corresponding settlement mechanism is required. In this embodiment of the present invention, the UE determines, according to the logged MDT configuration information, the MBMS set used for triggering the logged MDT measurement and the measurement parameter used for performing the logged MDT measurement, and performs the logged MDT measurement based on the measurement parameter when determining that the MBMS used for triggering the logged MDT measurement and belonging to the MBMS set is being received, thereby implementing the logged MDT measurement for the MBMS.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is determined that an MBMS belonging to the MBMS set is being received, thereby implementing the logged MDT measurement.

Optionally, as another embodiment, in step 520, the UE may determine, according to the logged MDT configuration information and a public land mobile network PLMN list stored by the user equipment, the MBMS set used for triggering the logged MDT measurement, where at least one PLMN of PLMNs to which cells belong is included in the PLMN list, where MBMSs in the MBMS set are located in the cells; or a PLMN corresponding to each MBMS in the MBMS set is included in the PLMN list.

The PLMN list stored by the UE includes at least one PLMN, and the PLMN list is used to determine a PLMN range in which the UE performs the logged MDT measurement.

Generally, in a non-MBMS MDT operation, the UE merely needs to check, after entering the idle state, whether a current registered PLMN (RPLMN) belongs to the PLMN list to determine whether MDT measurement can be started right now. The UE probably receives an MBMS at another frequency at the same time when the UE camps on the current RPLMN or keeps in a connected state, while a PLMN to which a cell that the received MBMS is located in belongs or a PLMN to which the received MBMS belongs probably differs from the current RPLMN. If the UE only checks whether the current RPLMN belongs to the PLMN list, the UE probably records an MBMS that does not need to be recorded or is not allowed to be recorded. Therefore, in this embodiment of the present invention, the MBMS set used for triggering the logged MDT measurement is determined according to the logged MDT configuration information and the PLMN list, which can prevent the UE from recording an MBMS service that does not need to be recorded or is not allowed to be recorded.

The MBMS used for triggering the logged MDT measurement may be any MBMS in the MBMS set.

Optionally, as an embodiment, in step 510, the UE may receive dedicated signaling from a network device, and the dedicated signaling includes the logged MDT configuration information. That is, the UE may receive, in a connected state, the logged MDT configuration information.

Optionally, as another embodiment, before step 510, the UE may receive a query message from the network device, where the query message may be used to instruct the UE to return a response message if the UE is interested in an MBMS service. The UE may send the response message to the network device according to the query message.

The network device may send, before sending the logged MDT configuration information, the query message to the UE served by the network device, so as to request the UE that is interested in the MBMS service to return the response message. In this way, the network device may send the logged MDT configuration information to the UE that returns the response message.

Optionally, as another embodiment, the UE may execute step 520 when receiving the logged MDT configuration information. The UE may immediately determine, after receiving the logged MDT configuration information, the MBMS set used for triggering the logged MDT measurement and the measurement parameter used for performing the logged MDT measurement. In step 530, if the UE determines that the MBMS used for triggering the logged MDT measurement is being received, the UE may perform the logged MDT measurement after entering the idle state. Certainly, the UE may also perform the logged MDT measurement in the connected state, which is not limited in this embodiment of the present invention.

Optionally, as another embodiment, the UE may perform step 520 in the idle state. The UE may determine, after entering the idle state, the MBMS set used for triggering the logged MDT measurement and the measurement parameter used for performing the logged MDT measurement.

Optionally, as another embodiment, the UE may perform step 530 in the idle state.

In this embodiment of the present invention, the entering the idle state by the UE may refer to that: the UE enters the idle state after receiving an RRC connection release message from the network device, or the UE enters the idle state in the event of a radio link failure and a failure in an RRC connection re-establishment process initiated by the UE.

Optionally, as another embodiment, the UE may monitor, when determining that the receiving of the MBMS used for triggering the logged MDT measurement has not yet started, whether to start receiving the MBMS used for triggering the logged MDT measurement.

The UE may perform the logged MDT measurement based on the measurement parameter when monitoring that the receiving of the MBMS used for triggering the logged MDT measurement starts.

As can be seen from the above, the UE may execute step 520 after entering the idle state. Optionally, as another embodiment, if the UE is in the idle state, the UE monitors, when determining that the receiving of the MBMS used for triggering the logged MDT measurement has not yet started, whether to start receiving the MBMS used for triggering the logged MDT measurement.

Optionally, as another embodiment, the UE performs the logged MDT measurement based on the measurement parameter when monitoring in monitoring duration that the receiving of the MBMS used for triggering the logged MDT measurement starts.

The UE may monitor in specified monitoring duration whether to start receiving the MBMS used for triggering the logged MDT measurement. If the UE monitors in the monitoring duration that the receiving of the MBMS used for triggering the logged MDT measurement starts, the UE may perform the logged MDT measurement.

Optionally, as another embodiment, if the UE has not monitored in the monitoring duration that the receiving of the MBMS used for triggering the logged MDT measurement starts, the UE may release the logged MDT configuration information.

For example, the monitoring duration herein may be duration of a timer; in this embodiment of the present invention, the timer may be referred to as a release timer. The UE may start the release timer when determining that the receiving of the MBMS used for triggering the logged MDT measurement has not yet started. In the duration of the release timer, the UE monitors whether to start receiving the MBMS used for triggering the logged MDT measurement. If the UE has not started, when the duration of the release timer ends, receiving the MBMS used for triggering the logged MDT measurement, the UE may release the logged MDT configuration information, thereby reducing occupation of a storage resource of the UE.

Optionally, as another embodiment, the monitoring duration may be pre-configured; or the monitoring duration may be monitoring duration indicated in the logged MDT configuration information, that is, the logged MDT configuration information may include the monitoring duration.

In addition, the logged MDT measurement configuration information may include an identifier of a measurement object. For example, the measurement object of the logged MDT measurement may be an MBSFN area, and the logged MDT configuration information may include an MBSFN identifier.

Multiple PMCHs may be configured in one MBSFN area, and each PMCH may carry one or more MBMS services. Therefore, the measurement object of the logged MDT measurement may also be one or more PMCHs in the MBSFN area. The PMCH may be designated by using a PMCH identifier, or may also be designated by using a modulation and coding manner used by the PMCH. One PMCH may be uniquely designated by using a PMCH identifier, and one or more PMCHs having the same modulation and coding manner may be simultaneously designated by using the modulation and coding manner. In other words, the logged MDT configuration information may include the PMCH identifier or information about the modulation and coding manner used by the PMCH.

The measurement object of the logged MDT measurement may also be at least one MBMS service transmitted in the MBSFN area.

Optionally, as another embodiment, the logged MDT configuration information may include an MBSFN identifier, and the MBMS set used for triggering the logged MDT measurement includes an MBMS that is transmitted by using an MBSFN indicated by the MBSFN identifier.

A specific process of performing the logged MDT measurement based on the measurement parameter by the UE may be as follows: determining a PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe.

If the logged MDT configuration information includes the MBSFN identifier, it may indicate that the measurement object of the logged MDT measurement is an MBSFN area indicated by the MBSFN identifier. The UE may determine the PMCH used for transmitting the MBMS used for triggering the logged MDT measurement, and measure the MBSFN reference signal of the MBSFN subframe in which the PMCH is located, so as to obtain the RSRQ or RSRP of the MBSFN reference signal in the subframe in which the MBMS transmitted in the MBSFN area is located.

Optionally, as another embodiment, the logged MDT configuration information may include at least one PMCH identifier, and the MBMS set used for triggering the logged MDT measurement includes an MBMS that is transmitted by using a PMCH indicated by each of the at least one PMCH identifier.

A process of performing the logged MDT measurement based on the measurement parameter by the UE may be as follows: determining a physical multicast channel PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe.

If the logged MDT configuration information includes the at least one PMCH identifier, it may indicate that the measurement object of the logged MDT measurement is the PMCH indicated by each of the at least one PMCH identifier. The UE may determine the PMCH used for transmitting the MBMS used for triggering the logged MDT measurement, and measure the MBSFN reference signal of the MBSFN subframe in which the PMCH is located, so as to obtain the RSRQ or RSRP of the MBSFN reference signal in the subframe in which the MBMS transmitted in the PMCH is located.

Optionally, as another embodiment, the logged MDT configuration information may include at least one MBMS identifier. The MBMS set used for triggering the logged MDT measurement may include an MBMS indicated by each of the at least one MBMS identifier. The UE may determine an MBSFN subframe in which the MBMS used for triggering the logged MDT measurement is located, and may measure, according to the measurement parameter, RSRP or RSRQ of an MBSFN reference signal transmitted in the MBSFN subframe.

Optionally, as another embodiment, the UE may measure, according to the measurement parameter, a packet loss rate of the MBMS used for triggering the logged MDT measurement. In this way, the UE may obtain a packet loss rate of an MBMS corresponding to a measurement object.

Optionally, as another embodiment, the logged MDT configuration information may not include any information about the MBMS used for triggering the logged MDT measurement, which means that the MBMS set used for triggering the logged MDT measurement may include any one or multiple MBMS services; in this case, the MBMS used for triggering the logged MDT measurement may be any MBMS received by the UE. A process of performing the logged MDT measurement based on the measurement parameter by the UE may be as follows: determining a PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe.

For example, if the logged MDT configuration information does not include the MBSFN identifier, the PMCH identifier, and the MBMS identifier, the MBMS used for triggering the logged MDT measurement may be any MBMS received by the UE.

Optionally, as another embodiment, the logged MDT configuration information may not include information about the MBMS used for triggering the logged MDT measurement, and then the MBMS set used for triggering the logged MDT measurement may include any one or multiple MBMSs that meet the following condition: at least one PLMN of PLMNs to which cells belong is included in the PLMN list, where MBMSs are located in the cells; or PLMNs corresponding to MBMSs are included in the PLMN list.

The measurement parameter may include MDT measurement duration and a measurement interval. Optionally, as another embodiment, a specific process of performing the logged MDT measurement by the UE may be as follows: the UE may determine the MDT measurement duration and determine the measurement interval. The UE may perform the logged MDT measurement according to the measurement interval within the MDT measurement duration.

The UE may periodically perform the logged MDT measurement within a period of time. Therefore, the UE may determine a time period for the measurement, that is, the MDT measurement duration. In addition, the UE may determine the measurement interval, which may also be construed as an MDT measurement period.

Optionally, as another embodiment, the logged MDT configuration information may include the MDT measurement duration. The UE may acquire the MDT measurement duration from the logged MDT configuration information.

Optionally, as another embodiment, the logged MDT configuration information may include the measurement interval. The UE may acquire the measurement interval from the logged MDT configuration information.

For example, the MDT measurement duration may be designated by the network device in the logged MDT configuration information. The measurement interval may be designated by the network device in the logged MDT configuration information, or may also be preset. For another example, the MDT measurement duration may be preset; the measurement interval may be designated by the network device in the logged MDT configuration information, or may also be preset.

Optionally, as another embodiment, the logged MDT configuration information may include a sending time of the logged MDT configuration information.

The UE may generate a measurement log of the logged MDT measurement. The measurement log may include at least one measurement result recorded during the logged MDT measurement, and a relative time corresponding to each measurement result in the at least one measurement result. The relative time corresponding to each measurement result is a time interval between a recording time of the measurement result and the sending time of the logged MDT configuration information.

The sending time of the logged MDT configuration information may also be referred to as an absolute time. The UE performs the logged MDT measurement in the MDT measurement duration according to a specific measurement interval, and may obtain at least one measurement result. If the logged MDT configuration information includes the absolute time, the UE may save the time interval between the recording time of each measurement result and the absolute time, so that the network device can determine the recording time of each measurement result to better analyze a network problem.

Optionally, as another embodiment, the UE may generate a measurement log of the logged MDT measurement. The measurement log may include at least one measurement result recorded during the logged MDT measurement, and a relative time corresponding to each measurement result in the at least one measurement result. The relative time corresponding to each measurement result is a time interval between a recording time of the measurement result and a time at which it is monitored that the receiving of the MBMS used for triggering the logged MDT measurement starts.

For example, if the UE monitors in monitoring duration that the receiving of the MBMS used for triggering the logged MDT measurement starts, the UE may record a time at which the receiving of the MBMS used for triggering the logged MDT measurement starts, and then save a time interval between the recording time of each measurement result and the receiving time.

Optionally, as another embodiment, the logged MDT configuration information may include a sending time of the logged MDT configuration information. The measurement log may further include a time interval between the time at which it is monitored that the receiving of the MBMS used for triggering the logged MDT measurement starts and the sending time of the logged MDT configuration information.

For example, the UE may further record a relative time between the time at which the receiving of the MBMS starts and an absolute time; in this way, the network device may determine a recording time of each measurement result according to these times, thereby better analyzing a network problem.

As described above, for the MBMS used for triggering the logged MDT measurement, the UE may measure at least one of the following parameters: the RSRP or RSRQ of the MBSFN reference signal, and a packet loss rate. Optionally, as another embodiment, each measurement result may include at least one of the following items: the RSRP of the MBSFN reference signal in the subframe in which the MBMS used for triggering the logged MDT measurement is located, the RSRQ of the foregoing MBSFN reference signal, and the packet loss rate of the MBMS used for triggering the logged MDT measurement.

Optionally, as another embodiment, each measurement result may further include at least one of the following items: an identifier of an MBSFN area in which the MBMS used for triggering the logged MDT measurement is located, and an identifier of a PMCH in which the MBMS used for triggering the logged MDT measurement is located.

Optionally, as another embodiment, each measurement result may further include at least one of the following items: RSRP corresponding to a CRS of a serving cell of the UE, RSRQ corresponding to the CRS of the serving cell of the UE, and a cell identifier of the serving cell of the UE.

Optionally, as another embodiment, after obtaining the measurement log, the UE may send, during establishment of an RRC connection to a network device currently providing a service, indication information to the network device currently providing the service, where the indication information may be used to indicate that the UE stores the measurement log. The UE may receive a request message from the network device currently providing the service, where the request message is used to instruct the UE to report the measurement log. The UE may send, according to the request message, the measurement log to the network device currently providing the service.

For example, the network device currently providing the service may be a network device that sends the logged MDT configuration information to the UE, or may also be another network device. Because the UE may be in a moving state and may move from a coverage area of one network device to a coverage area of another network device, the UE may notify, during initiation of an RRC connection, the network device currently providing the service that the UE stores the measurement log.

In addition, the UE may release the logged MDT configuration information and the measurement log after sending the measurement log to the network device currently providing the service.

Alternatively, the UE may release the logged MDT configuration information and the measurement log after storing the measurement log for 48 hours.

Alternatively, the UE may release the logged MDT configuration information after the MDT measurement duration ends.

Optionally, as another embodiment, when the UE establishes the RRC connection to the network device currently providing the service, if the UE stores the logged MDT configuration information and has not monitored that the receiving of the MBMS used for triggering the logged MDT measurement starts, the UE may send indication information to the network device currently providing the service, where the indication information is used to indicate that the UE stores the logged MDT configuration information and has not monitored that the receiving of the MBMS used for triggering the logged MDT measurement starts. In this way, if the network device currently providing the service requires the UE to perform the logged MDT measurement, the network device does not need to deliver the logged MDT configuration information to the UE, thereby reducing signaling overheads.

For example, before the UE releases the logged MDT configuration information according to the foregoing release timer, the UE initiates an RRC connection to the network device currently providing the service; in this case, the UE may notify the network device that the UE stores the logged MDT configuration information and has not monitored that the receiving of the MBMS used for triggering the logged MDT measurement starts.

For another example, if after the UE enters the idle state and before the UE starts receiving the MBMS used for triggering the logged MDT measurement, the UE initiates an RRC connection to the network device currently providing the service; in this case, the UE may also notify the network device that the UE stores the logged MDT configuration information and has not monitored that the receiving of the MBMS used for triggering the logged MDT measurement starts.

FIG. 6a is a schematic flowchart of a logged MDT measurement method according to another embodiment of the present invention. The method in FIG. 6a is executed by a UE.

610a. The UE receives logged MDT configuration information.

620a. The UE determines, according to the logged MDT configuration information, an MBMS set used for triggering logged MDT measurement and a measurement parameter used for performing the logged MDT measurement.

630a. The UE monitors, when determining that receiving of an MBMS used for triggering the logged MDT measurement has not yet started, whether to start receiving the MBMS used for triggering the logged MDT measurement.

640a. The UE performs the logged MDT measurement based on the measurement parameter when monitoring that the receiving of the MBMS used for triggering the logged MDT measurement starts.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is monitored that receiving of an MBMS belonging to the MBMS set starts, thereby implementing the logged MDT measurement. The logged MDT measurement for the MBMS can be implemented.

Optionally, as another embodiment, in step 620a, the user equipment may determine, according to the logged MDT configuration information and a public land mobile network PLMN list stored by the UE, the MBMS set used for triggering the logged MDT measurement, where at least one PLMN of PLMNs to which cells belong is included in the PLMN list, where MBMSs in the MBMS set are located in the cells; or a PLMN corresponding to each MBMS in the MBMS set is included in the PLMN list.

Optionally, as another embodiment, the UE may execute step 620a when receiving the logged MDT configuration information. The UE may immediately determine, after receiving the logged MDT configuration information, the MBMS set used for triggering the logged MDT measurement and the measurement parameter used for performing the logged MDT measurement. Correspondingly, step 630a and step 640a may be executed by the UE in a connected state.

Optionally, as another embodiment, the UE may perform step 620a in an idle state. The UE may determine, after entering the idle state, the MBMS set used for triggering the logged MDT measurement and the measurement parameter used for performing the logged MDT measurement.

Optionally, as another embodiment, the UE may perform step 630a in the idle state.

Optionally, as another embodiment, the UE may perform the logged MDT measurement based on the measurement parameter when monitoring in monitoring duration that the receiving of the MBMS used for triggering the logged MDT measurement starts.

Optionally, as another embodiment, if the UE has not monitored in the monitoring duration that the receiving of the MBMS used for triggering the logged MDT measurement starts, the UE may release the logged MDT configuration information.

For example, the monitoring duration herein may be duration of a timer; in this embodiment of the present invention, the timer may be referred to as a release timer. The UE may start the release timer when determining that the receiving of the MBMS used for triggering the logged MDT measurement has not yet started. In the duration of the release timer, the UE monitors whether to start receiving the MBMS used for triggering the logged MDT measurement. If the UE has not started, when the duration of the release timer ends, receiving the MBMS used for triggering the logged MDT measurement, the UE may release the logged MDT configuration information, thereby reducing occupation of a storage resource of the UE.

Optionally, as another embodiment, the monitoring duration may be one of the following items: pre-configured monitoring duration, and monitoring duration indicated in the logged MDT configuration information.

Optionally, as another embodiment, the logged MDT configuration information may include an MBSFN identifier, and the MBMS set used for triggering the logged MDT measurement includes an MBMS that is transmitted by using an MBSFN indicated by the MBSFN identifier.

A specific process of performing the logged MDT measurement based on the measurement parameter by the UE may be as follows: determining a PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe.

Optionally, as another embodiment, the logged MDT configuration information may include at least one PMCH identifier, and the MBMS set used for triggering the logged MDT measurement includes an MBMS that is transmitted by using a PMCH indicated by each of the at least one PMCH identifier.

A process of performing the logged MDT measurement based on the measurement parameter by the UE may be as follows: determining a physical multicast channel PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe.

Optionally, as another embodiment, the logged MDT configuration information may include at least one MBMS identifier. The MBMS set used for triggering the logged MDT measurement may include an MBMS indicated by each of the at least one MBMS identifier. The UE may determine an MBSFN subframe in which the MBMS used for triggering the logged MDT measurement is located, and may measure, according to the measurement parameter, RSRP or RSRQ of an MBSFN reference signal transmitted in the MBSFN subframe.

Optionally, as another embodiment, the UE may measure, according to the measurement parameter, a packet loss rate of the MBMS used for triggering the logged MDT measurement. In this way, the UE may obtain a packet loss rate of an MBMS corresponding to a measurement object.

Optionally, as another embodiment, the logged MDT configuration information may not include any information about the MBMS used for triggering the logged MDT measurement, which means that the MBMS set used for triggering the logged MDT measurement may include any one or multiple MBMS services; in this case, the MBMS used for triggering the logged MDT measurement may be any MBMS received by the UE. A process of performing the logged MDT measurement based on the measurement parameter by the UE may be as follows: determining a PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe. For example, if the logged MDT configuration information does not include the MBSFN identifier, the PMCH identifier, and the MBMS identifier, the MBMS used for triggering the logged MDT measurement may be any MBMS received by the UE.

Optionally, as another embodiment, the logged MDT configuration information may not include information about the MBMS used for triggering the logged MDT measurement, and then the MBMS set used for triggering the logged MDT measurement includes any one or multiple MBMSs that meet the following condition: at least one PLMN of PLMNs to which cells belong is included in the PLMN list stored by the UE, where MBMSs are located in the cells; or PLMNs corresponding to MBMSs are included in the PLMN list stored by the UE.

The measurement parameter may include MDT measurement duration and a measurement interval. Optionally, as another embodiment, a specific process of performing the logged MDT measurement by the UE may be as follows: the UE may determine the MDT measurement duration and determine the measurement interval. The UE may perform the logged MDT measurement according to the measurement interval within the MDT measurement duration.

Optionally, as another embodiment, the logged MDT configuration information may include a sending time of the logged MDT configuration information.

The UE may generate a measurement log of the logged MDT measurement. The measurement log may include at least one measurement result recorded during the logged MDT measurement, and a relative time corresponding to each measurement result in the at least one measurement result. The relative time corresponding to each measurement result is a time interval between a recording time of the measurement result and the sending time of the logged MDT configuration information.

If it is monitored in monitoring duration that the receiving of the MBMS used for triggering the logged MDT measurement starts, the UE may execute the logged MDT measurement, thereby generating the measurement log.

Optionally, as another embodiment, the UE may generate a measurement log of the logged MDT measurement. The measurement log may include at least one measurement result recorded during the logged MDT measurement, and a relative time corresponding to each measurement result in the at least one measurement result. The relative time corresponding to each measurement result is a time interval between a recording time of the measurement result and a time at which it is monitored that the receiving of the MBMS used for triggering the logged MDT measurement starts.

Optionally, as another embodiment, the logged MDT configuration information may include a sending time of the logged MDT configuration information. The measurement log may further include a time interval between the time at which it is monitored that the receiving of the MBMS used for triggering the logged MDT measurement starts and the sending time of the logged MDT configuration information.

Optionally, as another embodiment, each measurement result may include at least one of the following items: the RSRP of the MBSFN reference signal in the subframe in which the MBMS used for triggering the logged MDT measurement is located, the RSRQ of the foregoing MBSFN reference signal, and the packet loss rate of the MBMS used for triggering the logged MDT measurement.

Optionally, as another embodiment, each measurement result may further include at least one of the following items: an identifier of an MBSFN area in which the MBMS used for triggering the logged MDT measurement is located, and an identifier of a PMCH in which the MBMS used for triggering the logged MDT measurement is located.

Optionally, as another embodiment, each measurement result may further include at least one of the following items: RSRP corresponding to a CRS of a serving cell of the UE, RSRQ corresponding to the CRS of the serving cell of the UE, and a cell identifier of the serving cell of the UE.

Optionally, as another embodiment, after obtaining the measurement log, the UE may send, during establishment of an RRC connection to a network device currently providing a service, indication information to the network device currently providing the service, where the indication information may be used to indicate that the UE stores the measurement log. The UE may receive a request message from the network device currently providing the service, where the request message is used to instruct the UE to report the measurement log. The UE may send, according to the request message, the measurement log to the network device currently providing the service.

The foregoing describes a specific process of performing the logged MDT measurement by the UE. The following will describe a specific process executed by a network device in a logged MDT measurement method.

FIG. 6b is a schematic flowchart of a logged MDT measurement method according to another embodiment of the present invention. The method in FIG. 6b is executed by a network device. A process in FIG. 6b corresponds to that in FIG. 5 or FIG. 6a, and therefore identical description is omitted appropriately.

610b. The network device determines logged MDT configuration information.

620b. The network device sends the logged MDT configuration information.

In this embodiment of the present invention, after the network device sends the logged MDT configuration information, a UE can perform logged MDT measurement according to the logged MDT configuration information, thereby implementing the logged MDT measurement.

Optionally, as an embodiment, the logged MDT configuration information may include an identifier of a measurement object. The measurement object may be an MBSFN area, and the MBSFN area may be indicated by an MBSFN identifier. Multiple PMCHs may be configured in one MBSFN area, and each PMCH may carry one or more MBMSs. Therefore, the measurement object of the logged MDT measurement may also be one or more PMCHs in the MBSFN area. The PMCH may be designated by using a PMCH identifier, or may also be designated by using a modulation and coding manner used by the PMCH. One PMCH may be uniquely designated by using a PMCH identifier, and one or more PMCHs having the same modulation and coding manner may be simultaneously designated by using the modulation and coding manner. In other words, the logged MDT configuration information may include the PMCH identifier or information about the modulation and coding manner used by the PMCH.

The measurement object may also be at least one MBMS transmitted in the MBSFN area. The at least one MBMS may be indicated by an MBMS identifier.

Therefore, the logged MDT configuration information may include at least one of the following items: an MBSFN identifier, at least one PMCH identifier, and at least one MBMS identifier.

As another embodiment, the logged MDT configuration information may include at least one of the following items: an MBSFN identifier, and at least one PMCH identifier.

The logged MDT configuration information is used by the UE to determine an MBMS set used for triggering logged MDT measurement and a measurement parameter used for performing the logged MDT measurement. If the logged MDT configuration information includes the MBSFN identifier, the MBMS set used for triggering the logged MDT measurement may include an MBMS transmitted by using an MBSFN indicated by the MBSFN identifier. If the logged MDT configuration information includes the at least one PMCH identifier, the MBMS set used for triggering the logged MDT measurement includes an MBMS that is transmitted by using a PMCH indicated by each of the at least one PMCH identifier.

In addition, if the logged MDT configuration information includes the at least one MBMS identifier, an MBMS used for triggering the logged MDT measurement may be an MBMS indicated by each of the at least one MBMS identifier.

Optionally, as another embodiment, the logged MDT configuration information may include monitoring duration, and the monitoring duration is used by the UE to monitor whether to start receiving an MBMS used for triggering the logged MDT measurement.

Optionally, as another embodiment, the logged MDT configuration information may include at least one of the following items: MDT measurement duration, and a measurement interval.

The MDT measurement duration indicates duration for which the UE performs the logged MDT measurement, and the measurement interval indicates a time interval at which the UE performs the logged MDT measurement. The MDT measurement duration and the measurement interval are measurement parameters of the logged MDT measurement.

Optionally, as another embodiment, after step 620*b*, when the network device establishes an RRC connection to the UE, the network device may receive indication information from the UE, where the indication information is used to indicate that the UE stores a measurement log. The network device may send a request message to the UE according to the indication information, where the request message is used to instruct the UE to report the measurement log. The network device may receive the measurement log that is sent according to the request message by the UE, where the measurement log is obtained after the UE performs the logged MDT measurement based on the measurement parameter.

Optionally, as another embodiment, the logged MDT configuration information may include a sending time of the logged MDT configuration information.

Optionally, as another embodiment, the logged MDT configuration information may not include information about the MBMS used for triggering the logged MDT measurement, which means that the MBMS used for triggering the logged MDT measurement may be any MBMS received by the UE, or the MBMS used for triggering the logged MDT measurement may be any MBMS that meets the following condition: at least one PLMN of PLMNs to which cells belong is included in a PLMN list stored by the UE, where MBMSs are located in the cells; or a PLMN corresponding to each MBMS in the MBMS set is included in a PLMN list stored by the UE.

Optionally, the measurement log may include at least one measurement result recorded during the logged MDT measurement and a relative time corresponding to each measurement result in the at least one measurement result, where the relative time corresponding to each measurement result is a time interval between a recording time of the measurement result and the sending time of the logged MDT configuration information.

Optionally, the measurement log may include at least one measurement result recorded during the logged MDT measurement and a relative time corresponding to each measurement result in the at least one measurement result, where the relative time corresponding to each measurement result is a time interval between a recording time of the measurement result and a time at which it is monitored that receiving of the MBMS used for triggering the logged MDT measurement starts.

The measurement log may further include a time interval between the time at which it is monitored that the receiving of the MBMS used for triggering the logged MDT measurement starts and the sending time of the logged MDT configuration information.

Optionally, as another embodiment, each measurement result may include at least one of the following items: RSRP of an MBSFN reference signal in a subframe in which the MBMS used for triggering the logged MDT measurement is located, RSRQ of the foregoing MBSFN reference signal, and a packet loss rate of the MBMS used for triggering the logged MDT measurement.

Optionally, as another embodiment, each measurement result may further include at least one of the following items: an MBSFN and a PMCH identifier.

Optionally, as another embodiment, each measurement result may further include at least one of the following items: RSRP corresponding to a CRS of a serving cell of the UE, RSRQ corresponding to the CRS of the serving cell of the UE, and a cell identifier of the serving cell of the UE.

Optionally, as another embodiment, when the network device establishes an RRC connection to the UE, the network device receives indication information from the UE, where the indication information is used to indicate that the UE stores the logged MDT configuration information and has not monitored that the receiving of the MBMS used for triggering the logged MDT measurement starts.

The foregoing describes in detail a specific process of the logged MDT measurement. The embodiments of the present invention are described in detail below with reference to specific examples. It should be understood that, the following examples are merely used for a person skilled in the art to better understand the embodiments of the present invention, and are not intended to limit the scope of the embodiments of the present invention.

Figure 7:
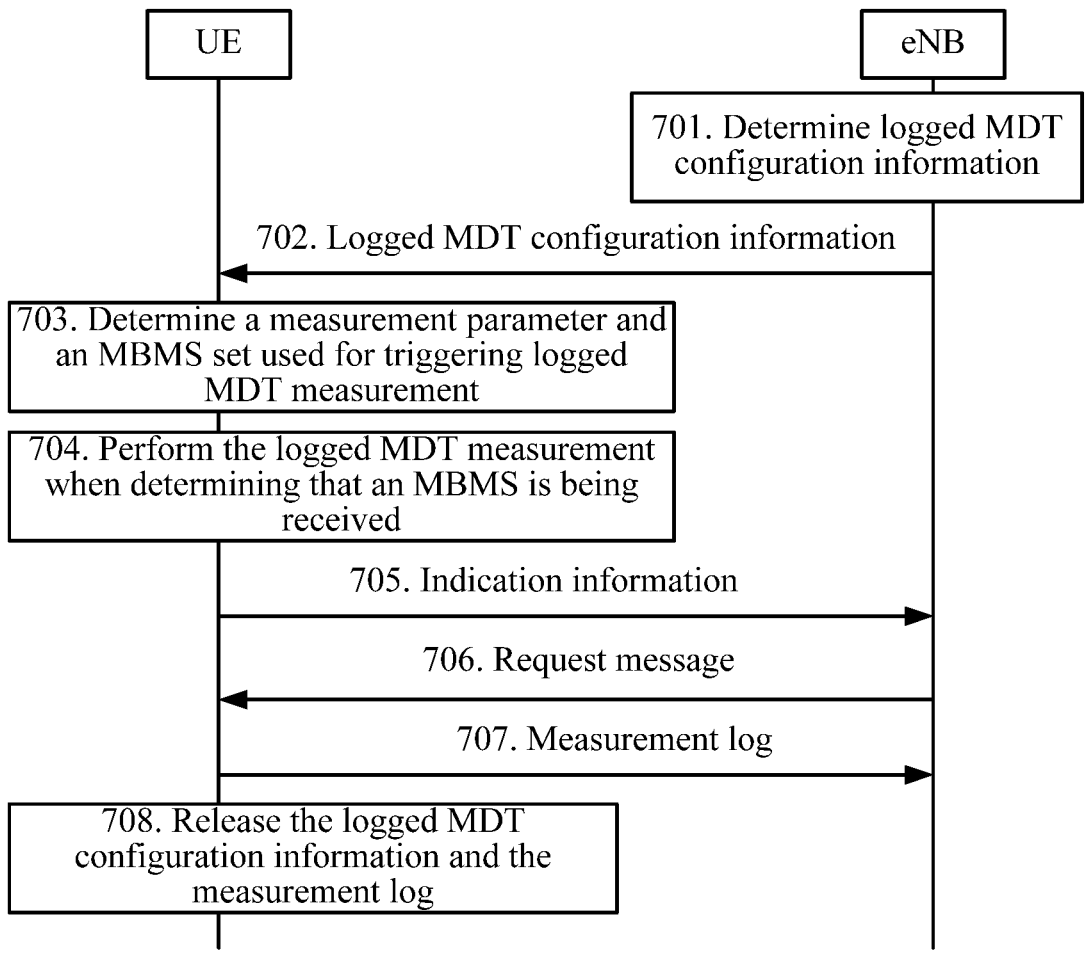
FIG. 7 is a schematic flowchart of a process of a logged MDT measurement method according to an embodiment of the present invention.
Figure 8:
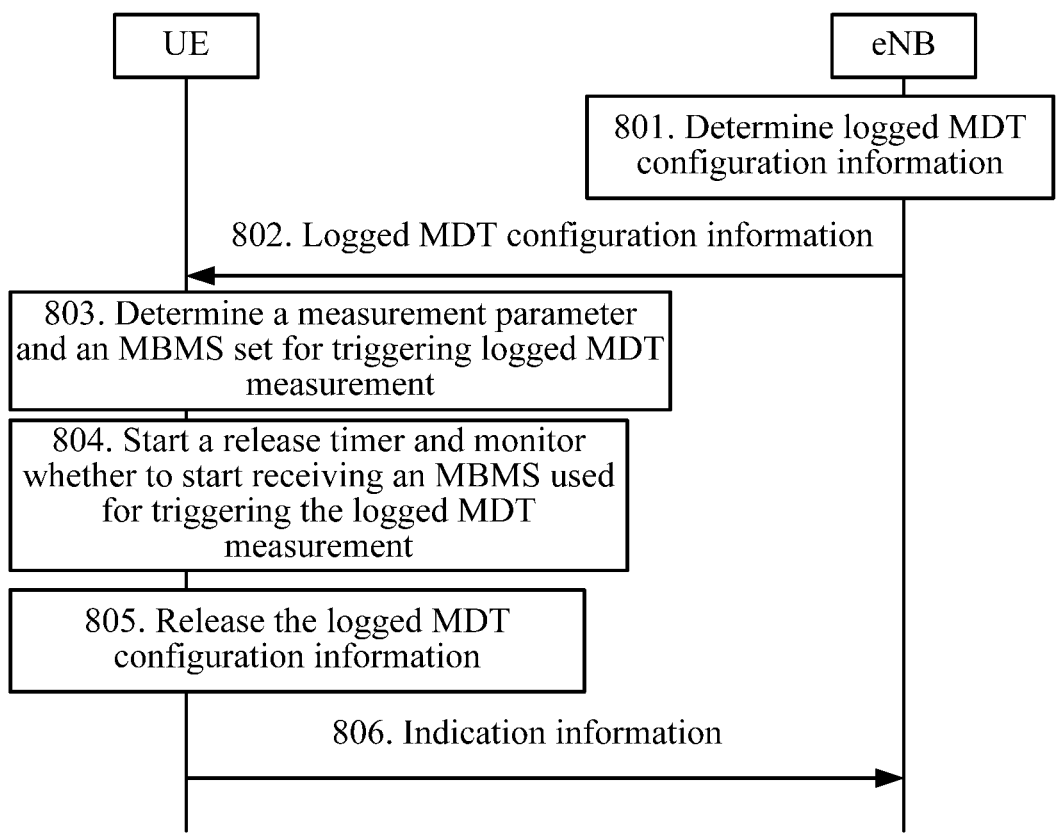
FIG. 8 is a schematic flowchart of a process of a logged MDT measurement method according to another embodiment of the present invention.
Figure 9:
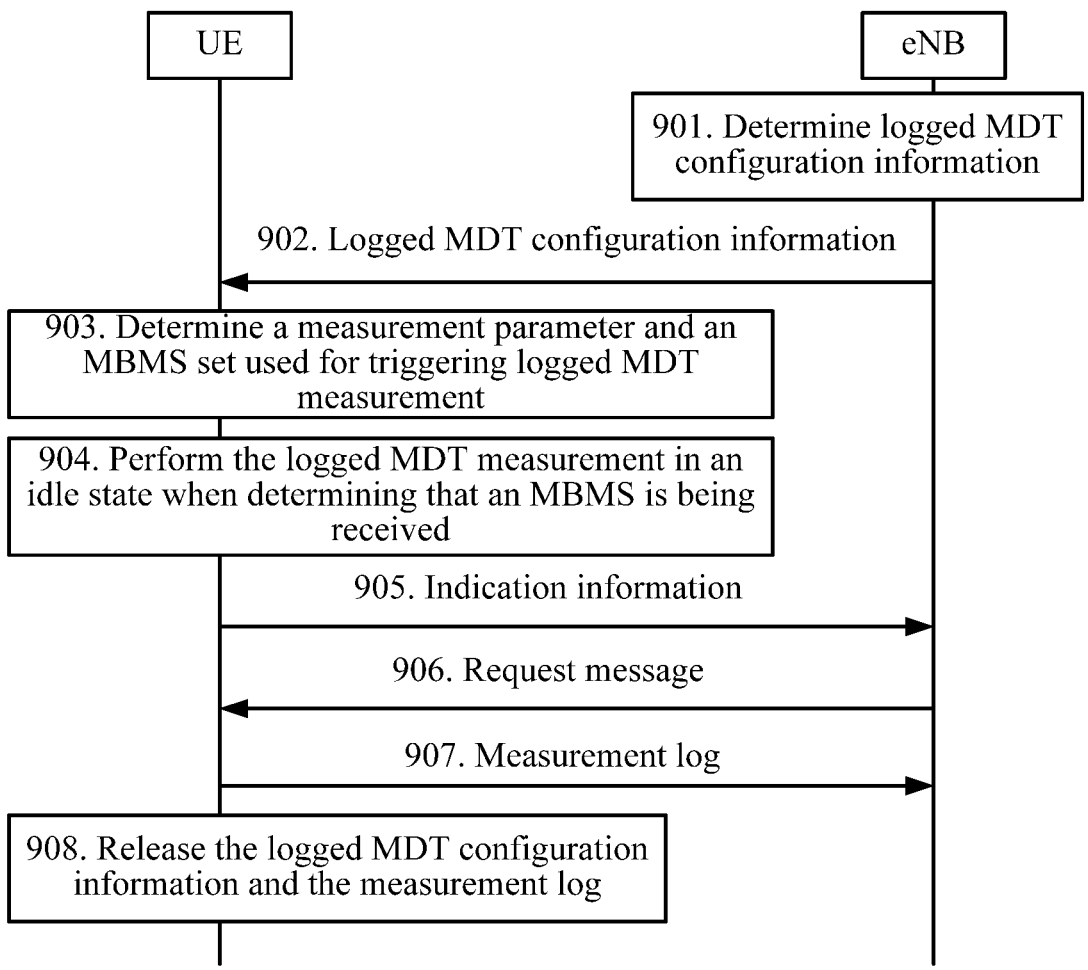
FIG. 9 is a schematic flowchart of a process of a logged MDT measurement method according to another embodiment of the present invention.
Figure 10:
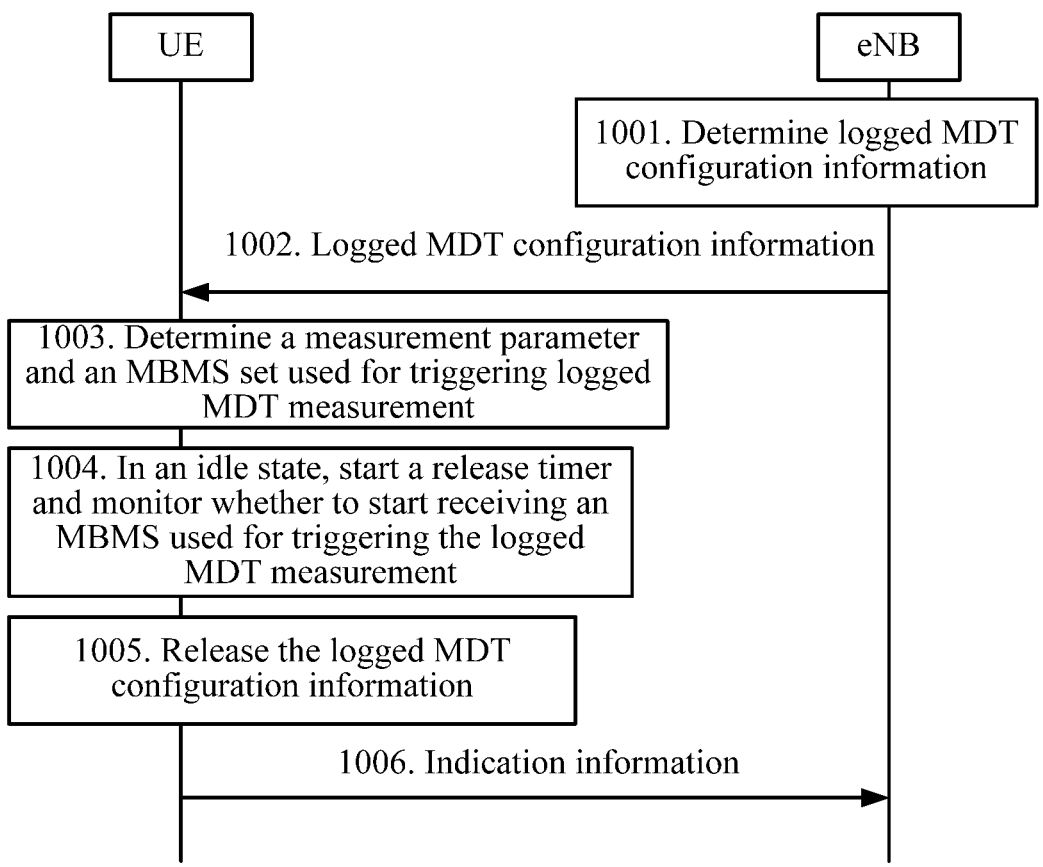
FIG. 10 is a schematic flowchart of a process of a logged MDT measurement method according to another embodiment of the present invention.

In FIG. 7 and FIG. 8 below, a UE determines, after receiving logged MDT configuration information, an MBMS set used for triggering logged MDT measurement and a measurement parameter used for performing the logged MDT measurement, and determines whether an MBMS used for triggering the logged MDT measurement is being received, so as to determine whether to perform the logged MDT measurement. In FIG. 9 and FIG. 10 below, a UE determines, after entering an idle state, an MBMS set used for triggering logged MDT measurement and a measurement parameter used for performing the logged MDT measurement, and determines whether an MBMS used for triggering the logged MDT measurement is being received, so as to determine whether to perform the logged MDT measurement. The following separately describes processes shown in FIG. 7 to FIG. 10.

FIG. 7 is a schematic flowchart of a process of a logged MDT measurement method according to an embodiment of the present invention. In FIG. 7, description is made by using an example in which a network device is an eNB.

701. The eNB determines logged MDT configuration information.

For example, the logged MDT configuration information may include at least one of the following items: an MBSFN identifier, and at least one PMCH identifier.

The logged MDT configuration information may further include at least one of the following items: MDT measurement duration and a measurement interval.

The logged MDT configuration information may further include a sending time of the logged MDT configuration information.

702. The eNB sends the logged MDT configuration information to a UE.

703. The UE determines, according to the logged MDT configuration information, an MBMS set used for triggering logged MDT measurement and a measurement parameter used for performing the logged MDT measurement.

The UE may immediately perform step 703 after receiving the logged MDT configuration information. For example, the logged MDT configuration information may include an MBSFN identifier, and the MBMS set used for triggering the logged MDT measurement includes an MBMS that is transmitted by using an MBSFN indicated by the MBSFN identifier. The logged MDT configuration information may include at least one PMCH identifier, and the MBMS set used for triggering the logged MDT measurement includes an MBMS that is transmitted by using a PMCH indicated by each of the at least one PMCH identifier.

The measurement parameter may include the MDT measurement duration and the measurement interval.

704. The UE performs the logged MDT measurement based on the measurement parameter when determining that an MBMS used for triggering the logged MDT measurement is being received.

The UE may immediately perform step 704 after step 703. For example, the UE may immediately start a timer T330, and start the logged MDT measurement. The UE may also start the timer T330 after entering an idle state, and start the logged MDT measurement.

Duration of the T330 is duration of the logged MDT measurement. The UE may perform the logged MDT measurement according to the measurement interval within the duration of the T330.

If the logged MDT configuration information includes the MDT measurement duration, the UE may set the duration of the T330 as the MDT measurement duration.

If the logged MDT configuration information includes the measurement interval, the UE may perform the logged MDT measurement according to the measurement interval.

The UE may perform the logged MDT measurement according to the measurement interval within the duration of the T330, so as to generate a measurement log. The measurement log may include at least one measurement result and a relative time corresponding to each measurement result. The relative time corresponding to each measurement result may be used to indicate a time interval between a recording time of the measurement result and the sending time of the logged MDT configuration information.

Each measurement result may include at least one of the following items: RSRP of an MBSFN reference signal in a subframe in which the MBMS used for triggering the logged MDT measurement is located, RSRQ of the foregoing MBSFN reference signal, and a packet loss rate of the MBMS used for triggering the logged MDT measurement.

Optionally, the logged MDT configuration information may include an MBSFN identifier, and the MBMS set used for triggering the logged MDT measurement includes an MBMS that is transmitted by using an MBSFN indicated by the MBSFN identifier.

A specific process of performing the logged MDT measurement based on the measurement parameter by the UE may be as follows: determining a PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe.

Optionally, the logged MDT configuration information includes at least one PMCH identifier, and the MBMS set used for triggering the logged MDT measurement includes an MBMS that is transmitted by using a PMCH indicated by each of the at least one PMCH identifier.

A specific process of performing the logged MDT measurement based on the measurement parameter by the UE may be as follows: determining a PMCH used for transmitting the MBMS used for triggering the logged MDT measurement; determining an MBSFN subframe occupied by the PMCH; and measuring, according to the measurement parameter, RSRP or RSRQ of an MBSFN reference signal transmitted in the MBSFN subframe.

Optionally, the logged MDT configuration information may include at least one MBMS identifier. The MBMS set used for triggering the logged MDT measurement may include an MBMS indicated by each of the at least one MBMS identifier. The UE may determine an MBSFN subframe in which the MBMS used for triggering the logged MDT measurement is located, and may measure, according to the measurement parameter, RSRP or RSRQ of an MBSFN reference signal transmitted in the MBSFN subframe.

Optionally, the logged MDT configuration information may not include information about the MBMS used for triggering the logged MDT measurement, and then the MBMS set used for triggering the logged MDT measurement may include any one or multiple MBMSs received by the UE, or the MBMS set used for triggering the logged MDT measurement may include any one or multiple MBMSs that meet the following condition: at least one PLMN of PLMNs to which cells belong is included in a PLMN list stored by the UE, where MBMSs are located in the cells; or a PLMN corresponding to each MBMS in the MBMS set is included in a PLMN list stored by the UE.

Optionally, the UE may measure, according to the measurement parameter, the packet loss rate of the MBMS used for triggering the logged MDT measurement.

Each measurement result may further include at least one of the following items: an MBSFN identifier, and at least one PMCH identifier.

Each measurement result may further include at least one of the following items: RSRP corresponding to a CRS of a serving cell of the UE, RSRQ corresponding to the CRS of the serving cell of the UE, and a cell identifier of the serving cell of the UE.

705. The UE sends indication information to the eNB during establishment of an RRC connection to the eNB, where the indication information is used to indicate that the UE stores a measurement log.

706. The eNB sends a request message to the UE, where the request message is used to instruct the UE to report the measurement log.

707. The UE sends the measurement log to the eNB.

708. The UE releases the logged MDT configuration information and the measurement log.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is determined that an MBMS belonging to the set is being received, thereby implementing the logged MDT measurement.

FIG. 8 is a schematic flowchart of a process of a logged MDT measurement method according to another embodiment of the present invention. In FIG. 8, description is made still by using an example in which a network device is an eNB.

Step 801 to step 803 in FIG. 8 are similar to step 701 to step 703 in FIG. 7, and the details are not described herein again.

804. The UE starts a release timer when determining that receiving of an MBMS used for triggering the logged MDT measurement has not yet started, and monitors whether to start receiving the MBMS used for triggering the logged MDT measurement.

The UE may immediately perform step 804 after step 803.

It should be understood that, duration of the release timer herein is the foregoing monitoring duration. The duration of the release timer may be preset; or the logged MDT configuration information in step 801 may include the duration of the release timer.

In the duration of the release timer, the UE may monitor whether to start receiving the MBMS used for triggering the logged MDT measurement.

805. If the UE has not monitored, when the duration of the release timer ends, that the receiving of the MBMS used for triggering the logged MDT measurement starts, the UE releases the logged MDT configuration information.

806. The UE sends indication information to the eNB during establishment of an RRC connection to the eNB, where the indication information is used to indicate that the UE stores the logged MDT configuration information and has not monitored that the receiving of the MBMS used for triggering the logged MDT measurement starts.

It should be understood that, if the UE monitors, before the duration of the release timer ends, that the receiving of the MBMS used for triggering the logged MDT measurement starts, the UE may perform the logged MDT measurement based on the measurement parameter. Reference may be made to step 704 to step 708 in FIG. 7 for a specific process of the logged MDT measurement and a specific process after the logged MDT measurement, and the details are not described herein again.

In this embodiment of the present invention, a UE starts a release timer if the UE determines that receiving of an MBMS used for triggering logged MDT measurement has not yet started. If the UE still has not monitored, when duration of the release timer ends, that the receiving of the MBMS used for triggering the logged MDT measurement starts, the UE releases logged MDT configuration information. In this way, occupation of resources of the UE can be reduced.

FIG. 9 is a schematic flowchart of a process of a logged MDT measurement method according to another embodiment of the present invention. In FIG. 9, description is made still by using an example in which a network device is an eNB.

Step 801 and step 802 in FIG. 9 are similar to step 701 and step 702 in FIG. 7, and the details are not described herein again.

903. The UE determines an MBMS set used for triggering logged MDT measurement and a measurement parameter used for performing the logged MDT measurement.

For example, the logged MDT configuration information may include an MBSFN identifier, and the MBMS set used for triggering the logged MDT measurement includes an MBMS that is transmitted by using an MBSFN indicated by the MBSFN identifier. The logged MDT configuration information may include at least one PMCH identifier, and the MBMS set used for triggering the logged MDT measurement includes an MBMS that is transmitted by using a PMCH indicated by each of the at least one PMCH identifier. The logged MDT configuration information may not include information about an MBMS used for triggering the logged MDT measurement, and then the MBMS set used for triggering the logged MDT measurement includes any one or multiple MBMSs received by the UE, or the MBMS set used for triggering the logged MDT measurement includes any one or multiple MBMSs that meet the following condition: at least one PLMN of PLMNs to which cells belong is included in a PLMN list stored by the UE, where MBMSs are located in the cells; or a PLMN corresponding to each MBMS in the MBMS set is included in a PLMN list stored by the UE. The measurement parameter may include MDT measurement duration and a measurement interval.

904. The UE performs the logged MDT measurement based on the measurement parameter in an idle state when determining that an MBMS used for triggering the logged MDT measurement is being received.

For example, the UE may start a timer T330, and start the logged MDT measurement. Duration of the T330 is duration of the logged MDT measurement. The UE may perform the logged MDT measurement according to the measurement interval within the duration of the T330.

If the logged MDT configuration information includes the MDT measurement duration, the UE may set the duration of the T330 as the MDT measurement duration.

If the logged MDT configuration information includes the measurement interval, the UE may perform the logged MDT measurement according to the measurement interval.

The UE may perform the logged MDT measurement according to the measurement interval within the duration of the T330, so as to obtain a measurement log. Therefore, the measurement log may include at least one measurement result and a relative time corresponding to each measurement result. The relative time corresponding to each measurement result may be used to indicate a time interval between a recording time of the measurement result and a sending time of the logged MDT configuration information.

Each measurement result may include at least one of the following items: RSRP of an MBSFN reference signal in a subframe in which the MBMS used for triggering the logged MDT measurement is located, RSRQ of the foregoing MBSFN reference signal, and a packet loss rate of a MBMS service used for triggering the logged MDT measurement.

Each measurement result may further include at least one of the following items: an MBSFN identifier, and at least one PMCH identifier.

Each measurement result may further include at least one of the following items: RSRP corresponding to a CRS of a serving cell of the UE, RSRQ corresponding to the CRS of the serving cell of the UE, and a cell identifier of the serving cell of the UE.

905. The UE sends indication information to the eNB during establishment of an RRC connection to the eNB, where the indication information is used to indicate that the UE stores a measurement log.

906. The eNB sends a request message to the UE, where the request message is used to instruct the UE to report the measurement log.

907. The UE sends MDT log information to the eNB.

908. The UE releases the logged MDT configuration information and the MDT log information.

In this embodiment of the present invention, an MBMS set used for triggering logged MDT measurement and a measurement parameter used for performing the logged MDT measurement are determined according to logged MDT configuration information, and the logged MDT measurement is performed based on the measurement parameter when it is determined that an MBMS belonging to the set is being received, thereby implementing the logged MDT measurement.

FIG. 10 is a schematic flowchart of a process of a logged MDT measurement method according to another embodiment of the present invention. In FIG. 10, description is made still by using an example in which a network device is an eNB.

Step 1001 and step 1002 are similar to step 701 and step 702 in FIG. 7, and the details are not described herein again.

1003. The UE determines an MBMS set used for triggering logged MDT measurement and a measurement parameter used for performing the logged MDT measurement.

1004. In an idle state, the UE starts a release timer when determining that receiving of an MBMS used for triggering the logged MDT measurement has not yet started, and monitors whether to start receiving the MBMS used for triggering the logged MDT measurement.

Step 1005 and step 1006 are similar to step 805 and step 806 in FIG. 8, and the details are not described herein again.

It should be understood that, if the UE monitors, before duration of the release timer ends, that the receiving of the MBMS used for triggering the logged MDT measurement starts, the UE may perform the logged MDT measurement based on the measurement parameter. Reference may be made to step 704 to step 708 in FIG. 7 for a specific process of the logged MDT measurement and a specific process after the logged MDT measurement, and the details are not described herein again.

In this embodiment of the present invention, a UE starts a release timer if the UE determines that receiving of an MBMS used for triggering logged MDT measurement has not yet started. If the UE still has not monitored, when duration of the release timer ends, that the receiving of the MBMS used for triggering the logged MDT measurement starts, the UE releases logged MDT configuration information. In this way, occupation of resources of the UE can be reduced.

Figure 11:
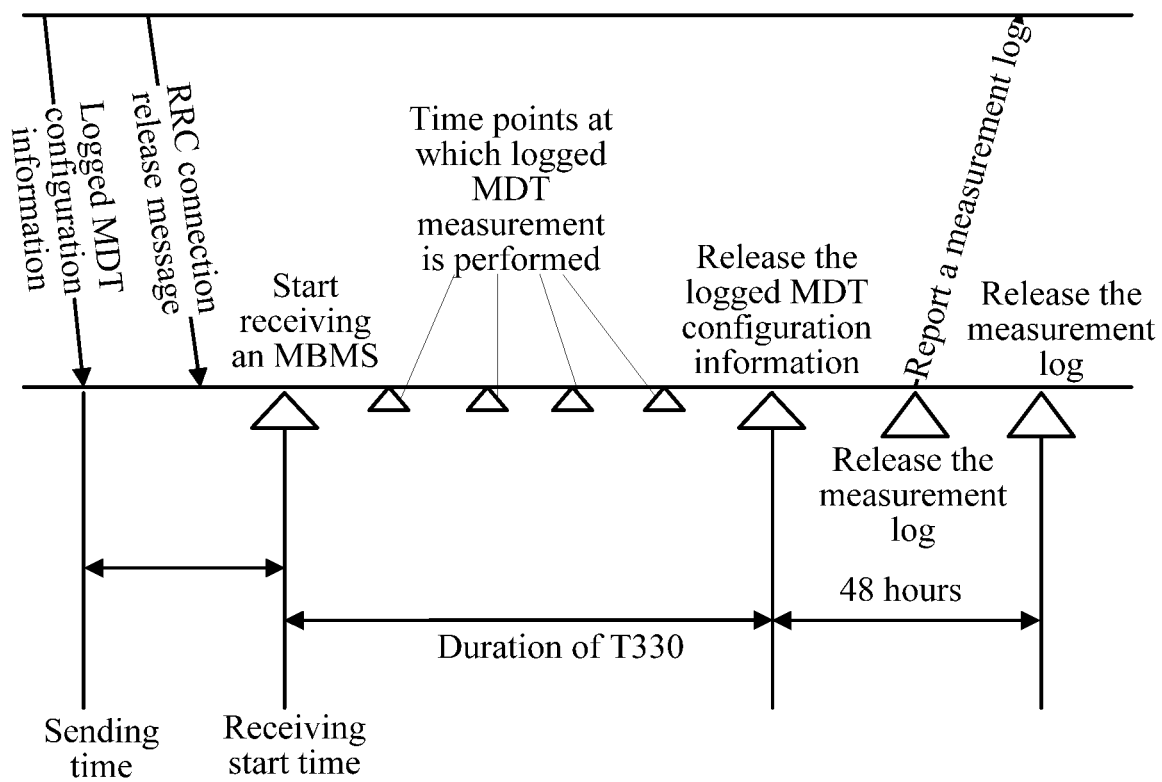
FIG. 11 is a schematic diagram of a timeline of logged MDT measurement according to an embodiment of the present invention.

FIG. 11 is a schematic diagram of a timeline of logged MDT measurement according to an embodiment of the present invention. The timeline shown in FIG. 11 is a timeline for a UE.

As shown in FIG. 11, the UE may receive, in a connected state, logged MDT configuration information from a network device. The logged MDT configuration information includes a sending time of the logged MDT configuration information. Herein, a transmission time of the logged MDT configuration information may be ignored; therefore, a time at which the network device sends the logged MDT configuration information may be identical with a time at which the UE receives the logged MDT configuration information.

At a moment after the UE receives the logged MDT configuration information, the UE receives an RRC connection release message; in this case, the UE may enter an idle state. At a moment after the UE enters the idle state, the UE may start receiving an MBMS used for triggering logged MDT measurement; at the same time, the UE may start a timer T330. The UE may perform the logged MDT measurement according to a measurement interval within duration of the timer T330. For example, as shown in FIG. 11, it is assumed that the UE performs the logged MDT measurement four times within the duration of the T330, to obtain a measurement log. In this way, the measurement log obtained by the UE may include four measurement results.

In addition, the measurement log may further include a relative time corresponding to each measurement result, and the relative time corresponding to each measurement result may be used to indicate a time interval between a recording time of the measurement result and a sending time of the logged MDT configuration information.

Alternatively, the relative time corresponding to each measurement result may be used to indicate a time interval between a recording time of the measurement result and a time at which the receiving of the MBMS used for triggering the logged MDT measurement starts. In this way, the measurement log may further include a time interval between the time at which the receiving of the MBMS used for triggering the logged MDT measurement starts and the sending time of the logged MDT configuration information.

The UE may release the logged MDT configuration information after the T330 times out.

If the UE initiates an RRC connection to the network device at a moment after the T300 times out, the UE may send indication information to the network device during the RRC connection, where the indication information may be used to indicate that the UE stores the measurement log. The network device may send a request message to the UE, where the request message is used to instruct the UE to report the measurement log. The UE may send the measurement log to the network device according to the request message. After reporting the measurement log, the UE may release the measurement log.

If the UE does not report the measurement log within 48 hours after the T300 times out, the UE may release the measurement log 48 hours later after the T330 times out.

In this embodiment of the present invention, after entering an idle state, a UE performs logged MDT measurement according to logged MDT configuration information when starting receiving an MBMS used for triggering the logged MDT measurement, thereby implementing the logged MDT measurement used for the MBMS.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A user equipment, comprising:
   a receiver configured to receive logged minimization of drive tests (MDT) configuration information;
   a memory storing a program; and
   a processor, the program configured to be executed in the processor and comprising instructions to:
      determine, according to the logged MDT configuration information, a Multimedia Broadcast Multicast Service (MBMS) set used for triggering a logged MDT measurement
   and a plurality of measurement parameters, wherein the plurality of measurement parameters comprise an MDT measurement duration and a measurement interval; and
   perform the logged MDT measurement, according to the measurement interval within the MDT measurement duration when determining that an MBMS, which is being received, belongs to the MBMS set.

2. The user equipment according to claim 1, wherein in response to the logged MDT configuration information not comprising information about the MBMS used for triggering the logged MDT measurement, the MBMS set used for triggering the logged MDT measurement comprises any one or multiple MBMSs.

3. The user equipment according to claim 1, wherein the user equipment further comprises a memory configured to store a public land mobile network (PLMN) list, wherein the program comprises further instructions to determine, according to the logged MDT configuration information and the PLMN list, the MBMS set used for triggering the logged MDT measurement, wherein at least one PLMN of a plurality of PLMNs to which cells belong is comprised in the PLMN list, wherein MBMSs in the MBMS set are located in the cells, or wherein a PLMN corresponding to each MBMS in the MBMS set is comprised in the PLMN list.

4. The user equipment according to claim 1, wherein the program comprises further instructions to:
   monitor for a start of receiving the MBMS that is used for triggering the logged MDT measurement, when it is determined that a receiving of the MBMS used for triggering the logged MDT measurement has not yet started; and
   perform the logged MDT measurement according to the interval within the MDT measurement duration when, during the monitoring, it is determined that the receiving starts of the MBMS used for triggering the logged MDT measurement.

5. The user equipment according to claim 4, wherein the program comprises further instructions to perform the logged MDT measurement, according to the measurement interval within the MDT measurement duration when, during the monitoring, for a monitoring duration, it is determined that the receiving starts of the MBMS used for triggering the logged MDT measurement.

6. The user equipment according to claim 4, wherein the program comprises further instructions to release the logged MDT configuration information if the processor has not monitored, in a monitoring duration, a start of the receiving of the MBMS used for triggering the logged MDT measurement.

7. The user equipment according to claim 5, wherein the monitoring duration is a pre-configured monitoring duration or a monitoring duration indicated in the logged MDT configuration information.

8. The user equipment according to claim 4, wherein the program comprises further instructions to monitor, in response to the user equipment being in an idle state when it is determined that the receiving has not yet started of the MBMS used for triggering the logged MDT measurement, for a start of the receiving of the MBMS used for triggering the logged MDT measurement.

9. The user equipment according to claim 1, wherein the program comprises further instructions to perform the logged MDT measurement based on the measurement interval within the MDT measurement duration in response to the user equipment being in an idle state when determining that the MBMS used for triggering the logged MDT measurement is being received.

10. The user equipment according to claim 1, wherein the logged MDT configuration information comprises a sending time of the logged MDT configuration information, and wherein the program comprises further instructions to generate a measurement log of the logged MDT measurement, wherein the measurement log comprises at least one measurement result recorded during the logged MDT measurement and a relative time corresponding to each measurement result in the at least one measurement result, wherein the relative time corresponding to each measurement result is a time interval between a recording time of the measurement result and the sending time of the logged MDT configuration information.

11. The user equipment according to claim 4, wherein the program comprises further instructions to generate a measurement log of the logged MDT measurement, wherein the measurement log comprises at least one measurement result recorded during the logged MDT measurement and a relative time corresponding to each measurement result in the at least one measurement result, wherein the relative time corresponding to each measurement result is a time interval between a recording time of the measurement result and a time at which, during monitoring, the receiving starts of the MBMS used for triggering the logged MDT measurement.

12. The user equipment according to claim 11, wherein the logged MDT configuration information comprises a sending time of the logged MDT configuration information, and wherein the measurement log further comprises a time interval between the time at which, during monitoring, the receiving starts of the MBMS used for triggering the logged MDT measurement, and the sending time of the logged MDT configuration information.

13. The user equipment according to claim 1, wherein the logged MDT configuration information comprises a Multimedia Broadcast Multicast Service Single Frequency Network (MBSFN) identifier, and the MBMS set used for triggering the logged MDT measurement comprises an MBMS that is transmitted by using an MBSFN indicated by the MBSFN identifier, and wherein the program comprises further instructions to perform the logged MDT measurement by being configured to:
- determine a physical multicast channel (PMCH) used for transmitting the MBMS used for triggering the logged MDT measurement;
- determine an MBSFN subframe occupied by the PMCH; and
- measure, according to the measurement interval within the MDT measurement duration, a reference signal received power (RSRP) or a reference signal received quality (RSRQ) of an MBSFN reference signal transmitted in the MBSFN subframe.

14. The user equipment according to claim 1, wherein the logged MDT configuration information comprises at least one PMCH identifier, and the MBMS set used for triggering the logged MDT measurement comprises an MBMS that is transmitted by using a PMCH indicated by each of the at least one PMCH identifier, and wherein the program comprises further instructions to perform the logged MDT measurement by being configured to:
- determine a physical multicast channel (PMCH) used for transmitting the MBMS used for triggering the logged MDT measurement;
- determine an MBSFN subframe occupied by the PMCH; and
- measure, according to the measurement interval within the MDT measurement duration, a reference signal received power (RSRP) or a reference signal received quality (RSRQ) of an MBSFN reference signal transmitted in the MBSFN subframe.

15. A logged minimization of drive tests (MDT) measurement method, comprising:
- receiving, by a user equipment, logged MDT configuration information;
- determining, by the user equipment, according to the logged MDT configuration information, a Multimedia Broadcast Multicast Service (MBMS) set used for triggering a logged MDT measurement and a plurality of measurement parameters, wherein the plurality of measurement parameters comprise an MDT measurement duration and a measurement interval; and
- performing, by the user equipment, the logged MDT measurement, according to the interval within the MDT measurement duration when determining that an MBMS, which is being received, belongs to the MBMS set.

16. The method according to claim 15, wherein in response to the logged MDT configuration information not comprising information about the MBMS used for triggering the logged MDT measurement, the MBMS set used for triggering the logged MDT measurement comprises any one or multiple MBMSs.

17. The method according to claim 15, wherein the performing the logged MDT measurement according to the measurement interval within the MDT measurement duration when determining that the MBMS, which is being received, belongs to the MBMS set comprises:
- monitoring, by the user equipment, for a start of receiving the MBMS that is used for triggering the logged MDT measurement, when determining that receiving of the MBMS used for triggering the logged MDT measurement has not yet started; and
- performing, by the user equipment, the logged MDT measurement according to the measurement interval within the MDT measurement duration when, during the monitoring, it is determined that the receiving starts of the MBMS used for triggering the logged MDT measurement.

18. The method according to claim 17, wherein the performing, by the user equipment, the logged MDT measurement according to the measurement interval within the MDT measurement duration when, during the monitoring, it is determined that the receiving starts of the MBMS used for triggering the logged MDT measurement, comprises:
- performing, by the user equipment, the logged MDT measurement according to the measurement interval within the MDT measurement measurement duration when, during the monitoring for a monitoring duration, it is determined that the receiving starts of the MBMS used for triggering the logged MDT measurement.

19. The method according to claim 15, wherein the logged MDT configuration information comprises a sending time of the logged MDT configuration information, and wherein the method further comprises:
- generating, by the user equipment, a measurement log of the logged MDT measurement, wherein the measurement log comprises at least one measurement result recorded during the logged MDT measurement and a relative time corresponding to each measurement result in the at least one measurement result, wherein the relative time corresponding to each measurement result is a time interval between a recording time of the measurement result and the sending time of the logged MDT configuration information.

20. The method according to claim 17, further comprising:
- generating, by the user equipment, a measurement log of the logged MDT measurement, wherein the measurement log comprises at least one measurement result recorded during the logged MDT measurement and a relative time corresponding to each measurement result in the at least one measurement result, wherein the relative time corresponding to each measurement result is a time interval between a recording time of the measurement result and a time at which, during monitoring, the receiving of the MBMS used for triggering the logged MDT measurement starts.

* * * * *

UNITED STATES PATENT AND TRADEMARK OFFICE
CERTIFICATE OF CORRECTION

PATENT NO. : 10,687,236 B2  
APPLICATION NO. : 15/211984  
DATED : June 16, 2020  
INVENTOR(S) : Li Page 1 of 1

It is certified that error appears in the above-identified patent and that said Letters Patent is hereby corrected as shown below:

In the Claims

Column 41, Line 59, Claim 15, delete "the interval" and insert --the measurement interval--.

Column 42, Line 30, Claim 18, delete "measurement measurement" and insert --measurement--.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*